United States Patent
Machida et al.

(10) Patent No.: US 10,787,581 B2
(45) Date of Patent: Sep. 29, 2020

(54) HEAT RAY SHIELDING PARTICLES, HEAT RAY SHIELDING PARTICLE DISPERSION LIQUID, HEAT RAY SHIELDING PARTICLE DISPERSION, HEAT RAY SHIELDING PARTICLE DISPERSION LAMINATED TRANSPARENT BASE MATERIAL, INFRARED RAY ABSORBING TRANSPARENT BASE MATERIAL, AND METHOD OF PRODUCING HEAT RAY SHIELDING PARTICLES

(71) Applicant: SUMITOMO METAL MINING CO., LTD., Tokyo (JP)

(72) Inventors: Keisuke Machida, Isa (JP); Mika Okada, Isa (JP); Kenichi Fujita, Isa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 222 days.

(21) Appl. No.: 15/522,024

(22) PCT Filed: Oct. 13, 2015

(86) PCT No.: PCT/JP2015/078885
§ 371 (c)(1),
(2) Date: Apr. 26, 2017

(87) PCT Pub. No.: WO2016/067905
PCT Pub. Date: May 6, 2016

(65) Prior Publication Data
US 2017/0334735 A1  Nov. 23, 2017

(30) Foreign Application Priority Data

Oct. 30, 2014 (JP) .................. 2014-221391

(51) Int. Cl.
| | | |
|---|---|---|
| C01G 41/00 | (2006.01) | |
| C09D 5/32 | (2006.01) | |
| C09D 7/00 | (2018.01) | |
| C09D 4/00 | (2006.01) | |
| G02B 5/22 | (2006.01) | |
| G02B 5/20 | (2006.01) | |
| C09D 7/48 | (2018.01) | |
| C09D 7/40 | (2018.01) | |
| C09K 3/00 | (2006.01) | |
| C09D 201/00 | (2006.01) | |
| C08K 3/22 | (2006.01) | |
| C09D 17/00 | (2006.01) | |
| C08L 101/00 | (2006.01) | |

(52) U.S. Cl.
CPC ............... *C09D 7/48* (2018.01); *C01G 41/00* (2013.01); *C01G 41/006* (2013.01); *C08K 3/22* (2013.01); *C08L 101/00* (2013.01); *C09D 4/00* (2013.01); *C09D 5/32* (2013.01); *C09D 7/40* (2018.01); *C09D 7/67* (2018.01); *C09D 7/68* (2018.01); *C09D 17/00* (2013.01); *C09D 201/00* (2013.01); *C09K 3/00* (2013.01); *G02B 5/208* (2013.01); *G02B 5/223* (2013.01); *C01P 2004/62* (2013.01); *C01P 2004/64* (2013.01); *C01P 2006/60* (2013.01)

(58) Field of Classification Search
CPC ... C09D 7/65; C09D 7/61; C09D 7/67; C09D 7/68; C09D 4/00; C09D 7/40; C09D 201/00; C09D 5/32; C09D 17/00; C01G 41/006; C01G 41/00; C08K 3/22; C09K 3/00; C08L 101/00; C01P 2006/60; C01P 2004/62; C01P 2004/64; G02B 5/223; G02B 5/208
See application file for complete search history.

(56) References Cited

U.S. PATENT DOCUMENTS

| | | | |
|---|---|---|---|
| 5,830,568 | A | 11/1998 | Kondo |
| 6,060,154 | A | 5/2000 | Adachi et al. |
| 8,083,847 | B2 | 12/2011 | Takeda et al. |

FOREIGN PATENT DOCUMENTS

| | | |
|---|---|---|
| JP | H02-136230 | 5/1990 |
| JP | H08-259279 | 10/1996 |
| JP | H11-181336 | 7/1999 |
| JP | 2011-063493 | 3/2011 |
| JP | 2011-063739 | 3/2011 |
| JP | 2012-072402 | 4/2012 |
| WO | 2005/037932 | 4/2005 |
| WO | 2009/059900 | 5/2009 |
| WO | 2010/046285 | 4/2010 |
| WO | 2011/005631 | 1/2011 |

OTHER PUBLICATIONS

International Search Report dated Dec. 28, 2015 with respect to PCT/JP2015/078885.

*Primary Examiner* — Cheng Yuan Huang
(74) *Attorney, Agent, or Firm* — IPUSA, PLLC

(57) ABSTRACT

Heat ray shielding particles are provided that are composite tungsten oxide particles having a hexagonal crystal structure represented by a general formula $Li_xM_yWO_z$, wherein the element M in the general formula is one or more kinds of elements selected from alkaline earth metals and alkali metals other than lithium, $0.25 \leq x \leq 0.80$, $0.10 \leq y \leq 0.50$, and $2.20 \leq z \leq 3.00$.

20 Claims, 1 Drawing Sheet

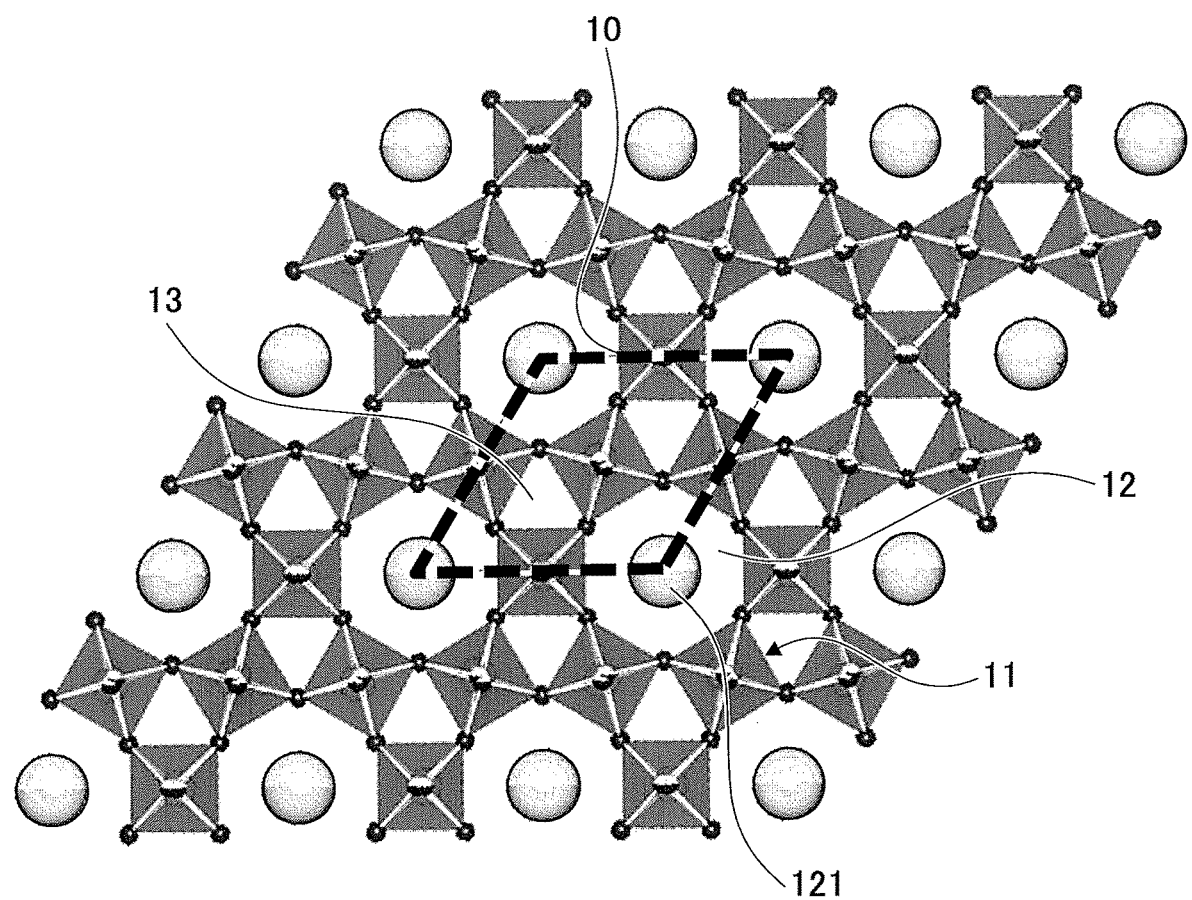

HEAT RAY SHIELDING PARTICLES, HEAT RAY SHIELDING PARTICLE DISPERSION LIQUID, HEAT RAY SHIELDING PARTICLE DISPERSION, HEAT RAY SHIELDING PARTICLE DISPERSION LAMINATED TRANSPARENT BASE MATERIAL, INFRARED RAY ABSORBING TRANSPARENT BASE MATERIAL, AND METHOD OF PRODUCING HEAT RAY SHIELDING PARTICLES

TECHNICAL FIELD

The present invention relates to heat ray shielding particles, a heat ray shielding particle dispersion liquid, a heat ray shielding particle dispersion, a heat ray shielding particle dispersion laminated transparent base material, an infrared ray absorbing transparent base material, and a method of producing heat ray shielding particles.

BACKGROUND ART

Various techniques have been proposed for heat ray shielding techniques for decreasing a solar transmittance while having a good visible light transmittance and keeping transparency. Among these, a heat ray shielding technique using a dispersion of conductive minute particles has merits such as an excellent heat ray shielding property, low cost, a permeability of electric waves, and a high weather resistance in comparison with other techniques.

For example, Patent Document 1 discloses an infrared ray absorptive synthetic molded product, obtained by molding a transparent synthetic resin containing a tin oxide fine powder in a dispersed state into a sheet or film shape and integrating it with a transparent synthetic resin substrate.

Patent Document 2 discloses a laminated glass including an interlayer interposed between at least two of transparent glass plates facing each other. In the laminated glass, functional ultrafine particles, which have a particle diameter less than or equal to 0.2 nm, are dispersed in the interlayer. It is disclosed that as for the functional ultrafine particles, a metal of Sn, Ti, Si, Zn, Zr, Fe, Al, Cr, Co, Ce, In, Ni, Ag, Cu, Pt, Mn, Ta, W, V, or Mo, an oxide, a nitride, a sulfide, or a doped substance of Sb or F is selected or a compound, containing two or more kinds selected from these materials, is selected.

The applicant discloses in Patent Document 3 a permselective membrane and an application liquid for permselective membranes, in which at least one kind of ruthenium oxide fine particles, titanium nitride fine particles, tantalum nitride fine particles, titanium silicide fine particles, molybdenum nitride fine particles, lanthanum boride fine particles, iron oxide fine particles, oxidized iron hydroxide (III) fine particles having an average particle diameter of 100 nm or below are dispersed.

However, there is a problem point that the infrared ray absorptive synthetic resin molded product and the like disclosed in Patent Documents 1 to 3 have not sufficient heat ray shielding performance for required high visible light transmittance.

A visible light transmittance calculated based on JIS R 3106 and a solar transmittance calculated based on JIS R 3106 are used in a method of evaluating a heart ray shielding structure that is a structure intended to shield heat rays. Note that in this specification of the application, a visible light transmittance calculated based on JIS R 3106 and a solar transmittance calculated based on JIS R 3106 may be simply referred to as a "visible light transmittance" and a "solar transmittance".

For example, when a visible light transmittance is 70% in the infrared ray absorptive synthetic resin molded product and the like disclosed in Patent Documents 1 to 3, the solar light transmittance exceeds 50% and the heat ray shielding performance is not sufficient.

The applicant discloses, in Patent Document 4, a fine particle dispersion of infrared ray shielding material, which is formed by dispersing fine particles of an infrared ray shielding material in a medium. The fine particle dispersion of infrared ray shielding material contains tungsten oxide fine particles and/or composite tungsten oxide fine particles. A particle diameter of the fine particles of infrared ray shielding material is greater than or equal to 1 nm and less than or equal to 800 nm.

In practical examples of Patent Document 4, $Cu_{0.2}WO_{2.72}$, $Al_{0.1}WO_{2.72}$, $Mn_{0.1}WO_{2.72}$, $In_{0.3}WO_3$, $Ba_{0.21}WO_3$, $Cs_{0.33}WO_3$, and the like are disclosed for the fine particles of the infrared ray shielding material, for example.

The heat ray shielding dispersion using the composite tungsten oxide fine particles disclosed in Patent Document 4 has high heat ray shielding performance, and the solar transmittance is improved to be lower than 50% when the visible light transmittance is 70%.

The composite tungsten oxide fine particles included in the fine particle dispersion of infrared ray shielding material disclosed in Patent Document 4 has a high strength of light absorption per unit concentration (may be simply referred to as "tinting strength" hereinafter), but there is a need for enhancing the tinting strength in order to further enhance the performance.

The applicant discloses, in Patent Document 5, a fine particle dispersion of near-infrared ray shielding material obtained by dispersing fine particles of near-infrared ray shielding material in a medium. In the fine particle dispersion of near-infrared ray shielding material, the fine particles of near-infrared ray shielding material contain fine particles of composite tungsten oxide represented by a general formula $Li_xM_yWO_z$ (wherein M is one or more kinds of elements selected from among Cs, Rb, K, Na, Ba, Ca, Sr and Mg; W is tungsten; O is oxygen; $0.1 \leq x \leq 1.0$; $0.1 \leq y \leq 0.5$; and $2.2 \leq z \leq 3.0$). The fine particles of composite tungsten oxide are fine particles having a hexagonal crystal structure. A particle diameter of the fine particles of near-infrared ray shielding material is between 1 nm and 500 nm.

It is disclosed in practical examples of Patent Document 5 that fine particles of $Li_{0.20}Cs_{0.33}WO_3$ and fine particles of $Li_{0.10}Cs_{0.33}WO_3$ are used as an example of the fine particles of near-infrared ray shielding material. Then, it is indicated that it is possible to reduce the used amount of filler, which is required for increasing the visible light transmittance to 70% or higher, when the solar light transmittance is 40% in comparison with a comparative example using $Cs_{0.33}WO_3$ as the fine particles of near-infrared ray shielding material. That is, the fine particles of near-infrared ray shielding material having an improved tinting strength are disclosed.

PRIOR ART DOCUMENTS

Patent Documents

Patent Document 1: Japanese Laid-open Patent Publication No. H02-136230
Patent Document 2: Japanese Laid-open Patent Publication No. H08-259279
Patent Document 3: Japanese Laid-open Patent Publication No. H11-181336
Patent Document 4: International Publication Pamphlet No. 2005/037932
Patent Document 5: Japanese Laid-open Patent Publication No. 2011-63493

SUMMARY OF THE INVENTION

Problem to be Solved by the Invention

However, in fine particles of $Li_{0.20}Cs_{0.33}WO_3$ and fine particles of $Li_{0.10}Cs_{0.33}WO_3$ that are the fine particles of composite tungsten oxide disclosed in Patent Document 5, the visible light transmittance may be decreased depending on a surrounding environment to be used and there is a problem of a weather resistance.

In view of the above problems of the conventional technologies, one aspect of the present invention has an object to provide heat ray shielding particles having both a tinting strength and a weather resistance.

Means for Solving the Problem

To solve the above problems, one aspect of the present invention provides heat ray shielding particles that are composite tungsten oxide particles having a hexagonal crystal structure represented by a general formula $Li_xM_yWO_z$, wherein the element M in the general formula is one or more kinds of elements selected from alkaline earth metals and alkali metals other than lithium, $0.25 \leq x \leq 0.80$, $0.10 \leq y \leq 0.50$, and $2.20 \leq z \leq 3.00$.

Advantageous Effects of the Invention

According to one aspect of the present invention, it is possible to provide heat ray shielding particles having both a tinting strength and a weather resistance.

BRIEF DESCRIPTION OF THE DRAWINGS

FIG. 1 is a schematic diagram of a crystal structure of composite tungsten oxide including a hexagonal crystal.

MODE FOR CARRYING OUT THE INVENTION

In the following, an embodiment of the present invention will be described with reference to the accompanying drawings. The present invention is not limited to the embodiment described below, and the various changes and substitutions could be made hereto without departing from scope of the invention.

(Heat-Ray-Shielding-Particles)

A configuration example of heat ray shielding particles according to an embodiment will be described.

The heat lay shielding particles according to the embodiment may be composite tungsten oxide particles having a hexagonal crystal structure represented by a general formula $Li_xM_yWO_z$.

Here, the element M in the above general formula may be one or more kinds of elements selected from alkaline earth metals and alkali metals except for lithium. Further, it is preferable that x, y, and z in the above formula respectively satisfy $0.25 \leq x \leq 0.80$, $0.10 \leq y \leq 0.50$, and $2.20 \leq z \leq 3.00$.

Note that Li represents lithium, W represents tungsten, and O represents oxygen in the above general formula.

Inventors of the present invention have earnestly investigated to obtain heat ray shielding particles of which a tinting strength and a weather resistance are excellent as described above. Then, the inventors have found out that it is possible, by doping a predetermined amount of lithium atoms into composite tungsten oxide having a hexagonal crystal structure, to obtain heat ray shielding particles of which a tinting strength and a weather resistance are excellent and accomplished the present invention.

Here, FIG. 1 illustrates a projection view of a crystal structure of $Cs_{0.33}WO_3$ as an example of a composite tungsten oxide having a hexagonal crystal structure as viewed from a (001) direction.

As illustrated in FIG. 1, in the composite tungsten oxide having the hexagonal crystal, six octahedrons formed by $WO_6$ units represented by numerals 11 are collected to constitute a hexagonal pole shaped void 12 (tunnel). Further, other than the above described hexagonal pole shaped voids 12, triangle pole shaped voids 13 are present. In the example illustrated in FIG. 1, cesium 121 is arranged in the hexagonal pole shaped voids 12.

As can been seen from the hexagonal crystal structure illustrated in FIG. 1, a unit cell 10 of the composite tungsten oxide having the hexagonal crystal structure has two triangle pole shaped voids 13 per one hexagonal pole shaped void 12. Because the triangle pole shaped void 13 is small in size, it is considered that it is possible to dope a lithium atom whose atomic radius is small into the void 13.

According to the investigation by the inventors of the present invention, it is considered that lithium atoms can be arranged in one or two of the two triangle pole shaped voids 13, which are present per unit cell, by doping a predetermined amount of lithium atoms into the composite tungsten oxide having the hexagonal crystal as described above, for example. Then, it is considered that the hexagonal crystal structure and the arrangement of other atoms present in the hexagonal pole shaped voids 12 are energetically stabilized by arranging the lithium atoms in the triangle pole shape voids 13. Thus, it is considered that a weather resistance of the composite tungsten oxide can be enhanced by doping lithium atoms to energetically stabilize the hexagonal crystal structure and the arrangement of other atoms that are present in the hexagonal pole shaped voids 12.

Further, at the same time, lithium atoms are doped into the triangle pole shaped voids 13, which are present in the composite tungsten oxide having the hexagonal crystal structure. Thereby, free electrons, which the lithium atoms have, are injected into the crystal. Thus, it is considered that light absorption through localized surface plasmon resonance that is absorption by free electrons is enhanced and the tinting strength is also enhanced.

Hence, as described above, the heat ray shielding particles according to the embodiment can be heat ray shielding particles, which are composite tungsten oxide particles having a hexagonal crystal structure represented by a general formula $Li_xM_yWO_z$ and have both a tinting strength and a weather resistance when a content of Li atoms is in a predetermined range.

Here, a content of lithium atoms of a composite tungsten oxide in the heat ray shielding particles according to the embodiment will be described.

As described above, in a case where the composite tungsten oxide is represented by the general formula $Li_xM_yWO_z$, it is preferable that a mole ratio x of elemental lithium with respect to elemental tungsten is greater than or equal to 0.25 and less than or equal to 0.80.

In the hexagonal crystal structure illustrated in FIG. 1, in a case where a lithium atom is arranged in one of the two triangle pole shaped voids 13 included in each unit cell, x becomes equal to ⅓ that is nearly equal to 0.33 in the general formula $Li_xM_yWO_z$. In a case where lithium atoms are arranged in all of the two triangle pole shaped voids 13 included in each unit cell, x becomes equal to ⅔ that is nearly equal to 0.67 in the general formula $Li_xM_yWO_z$.

However, even in a case where one or more lithium atoms are not uniformly doped into triangle pole shaped voids included in each unit cell, that is, even in a case where a part in which lithium atoms are not doped into both of two triangle pole shaped voids is partly included, the hexagonal crystal structure and the arrangement of other atoms present in the hexagonal pole shaped voids can be energetically stabilized. Specifically, as described above, by making the mole ratio of elemental lithium with respect to elemental tungsten greater than or equal to 0.25, the hexagonal crystal structure and the arrangement of other atoms present in the hexagonal pole shaped voids 12 can be energetically stabilized. Further, because the tinting strength of the composite tungsten oxide is increased by injecting, in to the crystal, free electrons included in lithium atoms as described above, the tinting strength can be increased by making the mole ratio of elemental lithium with respect to elemental tungsten greater than or equal to 0.25.

The Lithium atoms doped into the composite tungsten oxide are mainly doped into the triangle pole shaped voids 13 illustrated in FIG. 13. However, in a case where the triangle pole shaped voids 13 are saturated, the lithium atoms can also be doped into the hexagonal pole shaped voids 12, for example. Thus, it is preferable to dope lithium more than 0.67 in order to fill the triangle pole shaped voids 13 with lithium more certainly.

However, when the doped amount of lithium is excessively increased, a by-product such as a lithium compound other than the composite tungsten oxide may be deposited and the heat ray absorbing effects may be decreased. Therefore, as described above, it is preferable that the mole ratio x of elemental lithium with respect to elemental tungsten is less than or equal to 0.80.

In the composite tungsten oxide, the hexagonal crystal structure and the arrangement of other atoms present in the hexagonal pole shaped voids are energetically stabilized to enhance the weather resistance especially in a case where one or two of the two triangle pole shaped voids of the unit cell are substantially homogeneously filled. Thus, it is preferable that the mole ratio x of elemental lithium with respect to elemental tungsten is near 0.33 or near 0.67. Hence, specifically, for example, it is more preferable that the mole ratio x of elemental lithium with respect to elemental tungsten is greater than or equal to 0.25 and less than or equal to 0.45, or greater than or equal to 0.55 and less than or equal to 0.75.

In the former case where "x" is greater than or equal to 0.25 and less than or equal to 0.45, in the composite tungsten oxide, it is possible to substantially uniformly dope lithium atoms for one of the two triangle pole shape voids in the unit cells. In the latter case where "x" is greater than or equal to 0.55 and less than or equal to 0.75, in the composite tungsten oxide, it is possible to substantially uniformly dope lithium atoms for both of the two triangle pole shape voids in the unit cells.

Next, the element M will be described. As described, it is preferable to use, as the element M, one or more kinds of elements selected from alkaline earth metals and alkali metals other than lithium. That is, it is preferable to use, as the element M, one or more kinds of elements selected from sodium (Na), potassium (K), rubidium (Rb), cesium (Cs), francium (Fr), calcium (Ca), strontium (Sr), barium (Ba), and radium (Ra).

Especially, it is more preferable that the element M is one or more kinds of elements selected from cesium, rubidium, potassium, and sodium. This is because, in a case where the element M is one or more kinds of elements selected from cesium, rubidium, potassium, and sodium, the crystal structure of the composite tungsten oxide becomes especially easy to be the hexagonal crystal and the structure becomes stabilized to especially enhance the weather resistance. Further, this is because a contrast between a transmittance of light in a visible range and a transmittance of light in an infrared range can be increased because the transmittance of light in the visible range is high and the transmittance of light in the infrared range, especially in a near-infrared range, is low.

A mole ratio y of the element M with respect to elemental tungsten is preferably greater than or equal to 0.10 and less than or equal to 0.50, is more preferably greater than or equal to 0.20 and less than or equal to 0.45, and is further more preferably greater than or equal to 0.25 and less than or equal to 0.40.

This is because the heat ray absorbing effects can be sufficiently obtained when the mole ratio y of the element M with respect to elemental tungsten is greater than or equal to 0.10. Although the element M is doped into the hexagonal pole shaped voids as described, when the mole ratio y of the element M with respect to elemental tungsten is excessive, there may be a case where a chemical compound of the element M is deposited and the heat ray absorbing effects are decreased. Hence, it is preferable that the mole ratio y of the element M with respect to elemental tungsten is less than or equal to 0.50.

Next, a mole ratio z of oxygen with respect to elemental tungsten will be described. It is preferable that the mole ratio z of oxygen with respect to elemental tungsten is greater than or equal to 2.20 and less than or equal to 3.00.

According to the investigation by the inventors of the present invention, tungsten oxide ($WO_z$), to which lithium or the element M is not added, also has an infrared ray absorptive property. However, in tungsten oxide, because there are no free electrons in a tungsten trioxide ($WO_3$), a reflection absorption property in a near-infrared region is small. Thus, by making "y" that is the ratio of elemental oxygen with respect to elemental tungsten of tungsten oxide ($WO_y$) less than 3, free electrons can be generated in the tungsten oxide to obtain particles having an efficient infrared ray absorptivity.

On the other hand, in composite tungsten oxide, free electrons are supplied by adding lithium and the element M. Therefore, strong infrared absorption through localized surface plasmon resonance caused by the supplied free electrons is expressed by the supplied free electrons even when z=3.00. Therefore, it is preferable that the mole ratio z of elemental oxygen with respect to elemental tungsten is less than or equal to 3.00.

Then, in terms of optical characteristics specifically, it is preferable that the mole ratio z of elemental oxygen with respect to elemental tungsten is greater than or equal to 2.20 and less than or equal to 3.00 as described above.

A particle diameter of the heat ray shielding particles according to the embodiment is not limited specifically, but may be freely selected. For example, the particle diameter may be selected based on an intended use of the heat ray shielding particles, a heat ray shielding particle dispersion liquid using the heat ray shielding particles, a heat ray shielding particle dispersion, a heat ray shielding particle dispersion laminated transparent base material, or the like, a degree of absorption of near-infrared light required by an intended purpose, productivity, and the like.

For example, it is preferable that a volume average particle diameter of the heat ray shielding particles according to the embodiment is greater than or equal to 1 nm and less than or equal to 500 nm. This is because strong near-infrared absorption can be exerted by the heat ray shielding particles according to the embodiment when the volume average particle diameter is less than or equal to 500 nm, and industrial production can be facilitated when the volume average particle diameter is greater than or equal to 1 nm.

For example, in a case where a heat ray shielding particle dispersion, a heat ray shielding particle dispersion liquid using the heat ray shielding particles, or the like is used for a purpose of requiring transparency, it is preferable that the volume average particle diameter of the heat ray shielding particles is less than or equal to 40 nm. This is because in a case where the volume average particle diameter of the heat ray shielding particles is less than or equal to 40 nm, it becomes possible to sufficiently inhibit scattering of light due to Rayleigh scattering and Mie scattering of the particles, to keep visibility in a visible light wavelength range, and to efficiently keep the transparency at the same time. In a case of using for a purpose of especially requiring transparency such as a protection against wind for a vehicle, in order to further inhibit the scattering, the volume average particle diameter of the heat ray shielding particles is preferably less than or equal to 30 nm and is more preferably less than or equal to 25 nm.

Noted that a volume average particle diameter means a particle diameter with an integrated value 50% in a size distribution acquired through a laser diffraction/scattering method. In the specification of this application, the volume average particle diameter is used as the same meaning in the other parts.

According to the heat ray shielding particles of the embodiment described above, it is possible to provide the heat ray shielding particles having both a tinting strength and a weather resistance.

Note that it is preferable, in terms of enhancing the weather resistance, that a surface treatment is applied to the heat ray shielding particles according to the embodiment. In specific, it is especially preferable, in terms of enhancing the weather resistance, that the heat ray shielding particles are covered by a chemical compound or oxide preferably containing one or more kinds selected from Si, Ti, Zr, and Al.

A method of performing the surface treatment is not particularly limited, but the surface treatment can be performed by a known method using an organic compound containing one or more kinds of Si, Ti, Zr, and Al, for example. For example, after producing the heat ray shielding particles by a method of producing the heat ray shielding particles according to the embodiment, the produced heat ray shielding particles are mixed with an organosilicon compound, then a hydrolysis treatment is performed to perform the surface treatment.

(Method of Producing Heat-Ray-Shielding-Particles)

Next, a method of producing heat ray shielding particles according to the embodiment will be described.

First, a first configuration example of a method of producing the heat ray shielding particles according to the embodiment described above will be described here. Descriptions overlapping with those that have been described for the heat ray shielding particles are partly omitted.

The method of producing the heat ray shielding particles according to the embodiment relates a production method of the heat ray shielding particles for producing the heat ray shielding particles described above. Then, a heat treatment can be applied, in a mixed atmosphere of inert gas and reducing gas, to a mixture that includes a substance containing lithium, a substance containing the element M, and a substance containing tungsten.

Here, starting materials used in the method of producing the heat ray shielding particles according to the embodiment will be described first.

In the first configuration example of the method of producing the heat ray shielding particles according to the embodiment, as described above, the substance containing lithium, the substance containing the element M, and the substance containing tungsten may be used as the starting materials.

For example, elemental lithium, a chloride salt of lithium, nitrate of lithium, sulfate of lithium, oxalate of lithium, oxide of lithium, carbonate of lithium, tungstate of lithium, hydroxide of lithium, or the like may be used as the substance containing lithium. The substance containing lithium is not limited to these, but various lithium-containing substances may be used. Especially, in terms of a reactivity and ease in handling, it is preferable to use, as the substance containing lithium, one or more kinds selected from lithium carbonate and lithium hydroxide.

Further, for example, the elemental element M, a chloride salt of the element M, nitrate of the element M, sulfate of the element M, oxalate of the element M, oxide of the element M, carbonate of the element M, tungstate of the element M, hydroxide of the element M, or the like may be used as the substance containing the element M. The substance containing the element M is not limited to these but various element M-containing substances may be used. Especially, in terms of a reactivity and ease in handling, it is preferable to use, as the substance containing the element M, one or more kinds selected from carbonate of the element M, hydroxide of the element M, and oxide of the element M.

The substance containing tungsten is also not particularly limited, but may be, for example, one or more kinds selected from tungstic acid; tungsten trioxide; tungsten dioxide; hydrate of tungsten oxide; tungsten hexachloride; ammonium tungstate; hydroxide of tungsten oxide obtained by dissolving tungsten hexachloride in an alcohol and drying the solution; hydrate of tungsten oxide obtained by dissolving tungsten hexachloride in an alcohol, adding water to the solution to form a precipitate, and drying the precipitate; a tungsten compound obtained by drying an aqueous solution of ammonium tungstate; and metal tungsten. Especially, in terms of a reactivity and ease in handling, it is preferable to use, as the substance containing tungsten, one or more kinds selected from metal tungsten, tungsten oxide, tungstic acid, and ammonium tungstate.

Then, before applying the heat treatment, a mixture of the starting materials, which includes the substance containing lithium, the substance containing the element M, and the substance containing tungsten, can be prepared.

As for the mixture of the starting materials, it is preferable to weigh, mix, and prepare the starting materials so that stoichiometric proportions of lithium, the element M, and tungsten in the mixture of the starting materials satisfy ranges of x and y in the general formula $Li_xM_yWO_z$ of the composite tungsten oxide to be generated. Note that as described above, it is preferable ranges of x and y satisfy $0.25 \leq x \leq 0.80$ and $0.10 \leq y \leq 0.50$ in the general formula $Li_xM_yWO_z$ of the composite tungsten oxide.

When preparing the mixture of the starting materials, it is preferable that the substance containing lithium, the substance containing the element M, and the substance containing tungsten are homogeneously mixed as far as possible, and if possible, are homogeneously mixed at a molecular level. Especially, in terms of further homogeneously mixing the starting materials, it is preferable to mix each of the above starting materials in liquid. Thus, it is preferable that each of the starting materials can be solved in a solvent such as water or an organic solvent.

When each of the starting materials can be solved in a solvent such as water or an organic solvent, a mixture of the starting materials especially homogeneously mixed can be obtained by vaporizing the solvent after sufficiently mixing the solvent with each of the starting materials.

However, the method of preparing the mixture of the starting materials is not limited to a case of solving in a solvent as described. For example, the mixture of the starting materials can be prepared by sufficiently and homogeneously mixing the respective starting materials through known means such as a mortar or a ball mil.

Next, a heat treatment, in a mixed atmosphere of inert gas and reducing gas, to the mixture of the starting materials will be described.

A mixed gas of inert gas and reducing gas can be used when applying the heat treatment as descried above. Types of inert gas and reducing gas used at that time and conditions for the heat treatment such as temperature and a heat treating time are not particularly limited. Types of gas to be used and conditions of the heat treatment may be selected as needed so that the mole ratio of elemental oxygen with respect to elemental tungsten satisfies $2.20 \leq z \leq 3.00$ in structure of the composite tungsten oxide that is the product material.

In specific, it is preferable to use hydrogen ($H_2$) as the reducing gas. In a case where hydrogen is used as the reducing gas, it is preferable to use, as the inert gas, Argon (Ar), nitrogen ($N_2$), or the like, for example.

A composition of the mixed gas of inert gas and reducing gas is not particularly limited. For example, in a case where the reducing gas is hydrogen, it is preferable that the proportion of the reducing gas with respect to the mixed atmosphere of the reducing gas and the inert gas is greater than or equal to 0.1% by volume and less than or equal to 20% by volume. Especially, it is more preferable that the proportion of the reducing gas is greater than or equal to 0.2% by volume and less than or equal to 20% by volume.

This is because it is possible to effectively progress the reduction reaction when the proportion of the reducing gas in the mixed gas is greater than or equal to 0.1% by volume. And, this is because the progression of the reduction reaction does not change largely even when the proportion of the reducing gas exceeds 20% by volume in the case where hydrogen is used as the reducing gas.

As for the conditions of the heat treatment in the mixed atmosphere of inert gas and reducing gas, for example, the heat treatment can be applied to the mixture of the starting materials at greater than or equal to 300° C. and less than or equal to 900° C. This is because a reaction of producing the composite tungsten oxide having the hexagonal crystal structure can be progressed by performing the heat treatment at higher than or equal to 300° C. However, because there is a possibility that a side reaction substance such as metal tungsten or a composite tungsten oxide having a structure other than the hexagonal crystal is generated when the heat treatment temperature is high, the heat treatment temperature is preferably lower than or equal to 900° C.

Further, after the heat treatment in the mixed atmosphere of the inert gas and the reducing gas, a heat treatment may be performed in an inert gas atmosphere as needed. In this case, the heat treatment in the inert gas atmosphere may be performed at temperature greater than or equal to 400° C. and less than or equal to 1200° C.

Note that a kind of the inert gas used at that time is not particularly limited. However, it is preferable to use gas the same as the inert gas used when forming the mixed atmosphere of the inert gas and the reducing gas.

In the above, the production method is described of producing the above described heat ray shielding particles by performing the heat treatment to the mixture that includes the substance containing lithium, the substance containing the element M, and the substance containing tungsten. However, the method of producing the heat ray shielding particles according to the embodiment is not limited to the above described first configuration example.

For example, as a second configuration example of a method of producing the heat ray shielding particles according to the embodiment, a method of producing heat ray shielding particles by applying, to a mixture that contains a substance containing lithium and a composite tungsten oxide containing the element M, a heat treatment in a mixed atmosphere of inert gas and reducing gas may be used.

The composite tungsten oxide containing the element M usable in the method of producing the heat ray shielding particles is not particularly limited. However, cesium tungsten oxide, potassium tungsten oxide, rubidium tungsten oxide, or the like may be used.

The substance containing lithium is not particularly limited. However, a substance similar to that used in the method of producing the heat ray shielding particles of the first configuration example may be preferably used, for example.

Other than starting materials being different, it can be performed in a way similar to the method of producing the heat ray shielding particles of the first configuration example. Therefore, its description is omitted here.

Next, a third configuration example of a method of producing heat ray shielding particles according to the embodiment described above will be described. For example, the third configuration example of the method of producing the heat ray shielding particles may include processes as follows.

The method includes a first heat treatment process of applying a heat treatment, in a mixed atmosphere of inert gas and reducing gas, to a first raw material mixture that includes a substance containing lithium, a substance containing the element M, and a substance containing tungsten, a mole ratio y1 of the element M with respect to elemental tungsten being $0.01 \leq y1 < 0.25$;

a second raw material mixture preparation process of preparing a second raw material mixture by adding and mixing a substance containing the element M into the processed mixture obtained through the first heat treatment process; and a second heat treatment process of applying a heat treatment, in a mixed atmosphere of inert gas and reducing gas, to the second raw material mixture, wherein a mole ratio y2 of a total of the element M that is included the first raw material mixture and the element M that is included in the substance containing the element M added in the second raw material mixture preparation process with respect to elemental tungsten included in the first raw material mixture is $0.10 \leq y2 \leq 0.50$.

According to the third configuration example of the method of producing the heat ray shielding particles, in the above described first configuration example of the method of producing the heat ray shielding particles of the embodiment, the heat treatment is performed in two steps to obtain a composite tungsten oxide having a hexagonal crystal structure more definitely.

In the following, each of the processes will be described.

First, in the first heat treatment process, similar to the case of the first configuration example, the heat treatment can be applied, in the mixed atmosphere of inert gas and reducing gas, to the first raw material mixture that includes the substance containing lithium, the substance containing the element M, and the substance containing tungsten.

However, in the first heat treatment of this configuration example, it is preferable to prepare the first raw material mixture by adding the substance containing the element M by an amount less than an additive amount of the substance containing the element M estimated from a composition in the targeted composite tungsten oxide. Specifically, it is preferable that the mole ratio y1 of the element M with respect to elemental tungsten included in the first raw material mixture is $0.01 \leq y1 < 0.25$.

Further, it is preferable to weigh, mix, and prepare the starting materials so that stoichiometric proportions of elemental lithium and elemental tungsten in the first raw material mixture satisfy a range of x in the general formula $Li_xM_yWO_z$ of the composite tungsten oxide to be generated. Note that as described above, it is preferable that a range of x satisfies $0.25 \leq x \leq 0.80$ in the general formula $Li_xM_yWO_z$ of the composite tungsten oxide.

The substance containing lithium, the substance containing the element M, and the substance containing tungsten, which are included in the first raw material mixture, are not particularly limited, but substances similar to those described in the first configuration example may be respectively used, for example.

Further, heat treatment conditions, kinds of inert gas and reducing gas to be used, and the like in the first heat treatment process are not particularly limited, but types of gas and conditions similar to those described in the first configuration example may be used, for example.

By applying the first heat treatment process, a composite tungsten oxide intermediate product represented by a general formula $Li_xM_{y1}WO_z$ ($0.25 \leq x \leq 0.80$, $0.01 \leq y1 < 0.25$) is generated.

Note that a heat treatment may be performed in an inert gas atmosphere as needed after the first heat treatment process. In this case, it is preferable to perform the heat treatment in the inert gas atmosphere at temperature greater than or equal to 400° C. and less than or equal to 1200° C.

A kind of the inert gas used at that time is not particularly limited, but it is preferable to use gas the same as the inert gas used in the first heat treatment process.

Next, after the first heat treatment process, the second raw material mixture can be prepared by adding and mixing the substance containing the element M to the processed mixture obtained through the first heat treatment process that is the composite tungsten oxide intermediate product. The mole ratio y2 of the total of the element M, which is included in the first raw material mixture, and the element M, which is included in the substance containing the element M added in the second raw material mixture preparation process, with respect to elemental tungsten included in the first raw material mixture can be $0.10 \leq y2 \leq 0.50$.

That is, in this configuration example, it is estimated from a composition of the targeted composite tungsten oxide. A part of the additive amount of the substance containing the element M can be added to the first raw material mixture supplied in the first heat treatment process, and the remnant of the additive amount can be added in the second raw material mixture preparation process.

The substance containing the element M added when preparing the second raw material mixture is not particularly limited, but a substance similar to that described in the first configuration example may be used, for example. Note that the substance containing the element M used when preparing the first raw material mixture and the substance containing the element M used when preparing the second raw material mixture may be the same or different.

Then, to the prepared second raw material mixture, the second heat treatment process can be applied to apply the heat treatment in the mixed atmosphere of inert gas and reducing gas. Heat treatment conditions, kinds of inert gas and reducing gas to be used, and the like in the second heat treatment process are not particularly limited, but types of gas and conditions similar to those described in the first configuration example may be used, for example. Further, heat treatment conditions and used gas may be the same as the first heat treatment process, but heat treatment conditions and used gas may be different from those of the first heat treatment process.

Note that a heat treatment may be performed in an inert gas atmosphere as needed after the second heat treatment process. In this case, it is preferable to perform the heat treatment in the inert gas atmosphere at temperature greater than or equal to 400° C. and less than or equal to 1200° C.

A kind of the inert gas used at that time is not particularly limited, but it is preferable to use gas the same as the inert gas used in the second heat treatment process.

The composite tungsten oxide having the hexagonal crystal structure can be more stably obtained through two steps of burning steps as described above without singly depositing a lithium compound. The cause is not sufficiently clear, but the inventors estimate its mechanisms as follows.

The hexagonal crystal structure is formed by the presence of the element M in the first heat treatment process. However, the composition at this time does not satisfy the element ratio that satisfies at least all of the hexagonal pole shaped voids present in the unit cells of the hexagonal composite tungsten oxide. That is, $y \geq 0.33$ is not satisfied. Accordingly, because more voids are present in the hexagonal composite tungsten oxide, lithium atoms become easily doped into the crystal lattice and become difficult to be deposited singly.

It is estimated that through adding the substance containing the element M to perform the second heat treatment process, lithium atoms are scattered to be doped into the triangle pole shaped voids while the hexagonal pole shaped voids present in the unit cells of the hexagonal composite tungsten oxide are stably filled with the element M. It is considered that, according to the above described mechanism, without singly depositing a lithium compound, the composite tungsten oxide having the hexagonal crystal structure can be obtained.

The methods of producing the heat ray shielding particles according to the embodiment have been described above. According to the method of producing the heat ray shielding particles of the embodiment, it is possible to produce the heat ray shielding particles having a tinting strength and a weather resistance.

(Heat-Ray-Shielding-Particle-Dispersion Liquid and Method of Producing the Liquid)

Next, a configuration example of a heat ray shielding particle dispersion liquid and a method of producing the liquid according to the embodiment will be described. Note that in this specification, the heat ray shielding particle dispersion liquid may be referred to as the "dispersion liquid" simply.

The heat ray shielding particle dispersion liquid according to the embodiment may contain the heat ray shielding particles described above and a liquid medium containing one or more kinds selected from water, an organic solvent, a liquid resin, and a liquid plasticizer for plastic. Note that it is preferable that, in the heat ray shielding particle dispersion liquid according to the embodiment, the heat ray shielding particles are dispersed in the liquid medium.

As described above, the heat ray shielding particle dispersion liquid according to the embodiment may contain the heat ray shielding particles according to the embodiment and the liquid medium. Therefore, descriptions overlapping with those that have been described for the heat ray shielding particles and the like are partly omitted.

First, the liquid medium contained in the heat ray shielding particle dispersion liquid according to the embodiment will be described here.

It is preferable that the liquid medium used when preparing the heat ray shielding particle dispersion liquid has a function to keep dispersibility of the heat ray shielding particle dispersion liquid.

A medium containing one or more kinds selected from water, an organic solvent, a liquid resin, and a liquid plasticizer for plastic may be used as the liquid medium. Note that in a case of containing two or more kinds selected from water, the organic solvent, the liquid resin, and the liquid plasticizer for plastic described above, a mixture of the contained components may be used as the liquid medium.

Then, as described above, it is preferable that the heat ray shielding particle dispersion liquid has a function to keep dispersibility of the heat ray shielding particle dispersion liquid. For example, as an organic solvent that satisfies the above requirement, various solvents such as an alcohol solvent, a ketone solvent, a hydrocarbon system solvent, a glycol solvent, an ester solvent, an amide solvent, or the like may be used. For example, specifically, as the organic solvent, an alcohol solvent such as such as isopropyl alcohol, methanol, ethanol, 1-methoxy-2-propanol, 1-propanol, isopropanol, butanol, pentanol, benzyl alcohol, or diacetone alcohol; a ketone solvent such as acetone, methyl ethyl ketone, methyl propyl ketone, methyl isobutyl ketone, cyclohexanone, isophorone, or dimethyl ketone; an ester solvent such as 3-methyl-methoxy-propionate or n-butyl acetate; a glycol derivative such as ethylene glycol monomethyl ether, ethylene glycol monoethyl ether, ethylene glycol isopropyl ether, propylene glycol monomethyl ether, propylene glycol monoethyl ether, propylene glycol methyl ether acetate, propylene glycol ethyl ether acetate, or propylene glycol monomethyl ether acetate; an amide such as formamide, N-methylformamide, dimethylformamide, dimethylacetamide, or N-methyl-2-pyrrolidone; an aromatic hydrocarbon such as toluene or xylene; a halogenated hydrocarbon such as ethylene chloride or chlorobenzene; or the like may be used.

Among the above described substances, it is preferable to use an organic solvent of which the polarity is low. Especially, it is more preferable to use, as the organic solvent, isopropyl alcohol, ethanol, 1-methoxy-2-propanol, dimethyl ketone, methyl ethyl ketone, methyl isobutyl ketone, toluene, propylene glycol monomethyl ether acetate, n-butyl acetate, or the like. One kind or two or more kinds of these organic solvents may be combined to be used.

It is preferable to use methyl methacrylate or the like as the liquid resin.

It is preferable to use, as the liquid plasticizer for plastic, a plasticizer that is a chemical compound of monohydric alcohol with organic acid ester, an ester plasticizer such as a polyhydric alcohol organic acid ester compound, a phosphoric acid plasticizer such as an organic phosphoric acid plasticizer, or the like. Among these, triethylene glycol di-2-ethyl hexanoate, triethylene glycol di-2-ethyl butyrate and tetraethylene glycol di-2-ethyl hexanoate may be more preferably used because of having low hydrolyzability.

In addition to the liquid medium described above, a dispersant, a coupling agent, a surface activating agent, and/or the like may be added as needed to a heat ray shielding particle dispersion liquid according to the embodiment. Components of these will be described.

The dispersant, the coupling agent, and the surface activating agent may be selected depending on an intended use, and may preferably have an amine-containing group, a hydroxyl group, a carboxyl group, or an epoxy group as a functional group. These functional groups are adhered to surfaces of the heat ray shielding particles to prevent the heat ray shielding particles from aggregating so that the heat ray shielding particles can be homogeneously dispersed in a heat ray shielding particle dispersion liquid or a heat ray shielding particle dispersion, which will be described later below.

For example, it is preferable to use, as the dispersant or the like, a phosphate compound, a polymeric dispersant, a silane coupling agent, a titanate coupling agent, an aluminum coupling agent or the like. Further, as the polymeric dispersant, an acrylic polymer dispersant, an urethane polymer dispersant, an acrylic block copolymer polymer dispersant, a polyether dispersant, a polyester polymer dispersant, or the like may be used. Note that the dispersant is not limited to these, but various dispersants may be used.

The additive amount of the dispersant when being added is not specifically limited. For example, it is preferable to add, with respect to 100 parts by mass of the heat ray shielding particles, the dispersant of greater than or equal to 10 parts by mass and less than or equal to 1000 parts by mass. It is more preferable to add, with respect to 100 parts by mass of the heat ray shielding particles, the dispersant of greater than or equal to 20 parts by mass and less than or equal to 200 parts by mass.

When the additive amount of the dispersant is within the above range, it is possible to more definitely inhibit the heat ray shielding particles from aggregating in the liquid and to keep dispersion stability.

The content of the heat ray shielding particles in the heat ray shielding particle dispersion liquid according to the embodiment is not particularly limited, but may be freely selected depending on an intended use.

For example, the content of the heat ray shielding particles contained in the heat ray shielding particle dispersion liquid according to the embodiment is preferably greater than or equal to 0.01% by mass and less than or equal to 50% by mass, is more preferably greater than or equal to 0.02% by mass and less than or equal to 20% by mass, and is furthermore preferably greater than or equal to 0.50% by mass and less than or equal to 20% by mass.

This is because the heat ray shielding particle dispersion liquid can have sufficient heat ray shielding performance by containing the heat ray shielding particles of greater than or equal to 0.01% by mass. Further, because of excellent ease of handling, it is preferably used when producing a coating layer or the like, which will be described later below.

However, aggregation easily occurs when the content of the heat ray shielding particles increases. Therefore, it is preferable in terms of productivity that the content of the heat ray shielding particles is less than or equal to 50% by mass so as to maintain the state in which the heat ray shielding particles are stably dispersed.

Next, a method of producing a heat ray shielding particle dispersion liquid according to the embodiment will be described.

For example, the heat ray shielding particle dispersion liquid may be produced by adding and dispersing the heat ray shielding particles into the liquid medium. Note that an appropriate amount of a dispersant, a coupling agent, a surface activating agent, and/or the like may be added as needed at the time of processing of adding and dispersing the heat ray shielding particles into the liquid medium.

The method of dispersing processing is not particularly limited as long as the heat ray shielding particles are uniformly dispersed in the liquid medium by the method. For example, a beads mill, a ball mill, a sand mill, ultrasonic dispersion, or the like may be used.

In order obtain the heat ray shielding particle dispersion liquid in which the heat ray shielding particles are homogeneously dispersed, above described dispersant or the like or various additive agents may be added or the PH may be adjusted when the heat ray shielding particle dispersion liquid is prepared.

(Heat-Ray-Shielding-Particle-Dispersion- and Method of Producing the Dispersion)

Next, a configuration example of a heat ray shielding particle dispersion and a method of producing the element according to the embodiment will be described.

The heat ray shielding particle dispersion according to the embodiment may include the heat ray shielding particles according to the embodiment and a binder. Thus, descriptions overlapping with those that have been described for the heat ray shielding particles and the like are partly omitted.

In the following, each component, which the heat ray shielding particle dispersion according to the embodiment can contain, will be described.

First, the binder will be described.

The binder is not particularly limited as long as the binder can solidify the heat ray shielding particles in a dispersed state. For example, an organic binder such as resin or an inorganic binder obtained by hydrolyzing metal alkoxide or the like may be used. Especially, it is preferable that the binder includes a thermoplastic resin or a UV curable resin. Note that the binder may be a solid-state binder in the heat ray shielding particle dispersion according to the embodiment.

In a case where the binder includes a thermoplastic resin, the thermoplastic resin is not particularly limited but freely selected depending on intensity, a transmittance, or the like to be required. For example, it is preferable to use, as the thermoplastic resin, one kind of resin selected from a resin group of polyethylene terephthalate resin, polycarbonate resin, acrylic resin, styrene resin, polyamide resin, polyethylene resin, vinyl chloride resin, olefin resin, epoxy resin, polyimide resin, fluororesin, an ethylene-vinyl-acetate copolymer, and polyvinyl acetal resin; a mixture of two or more kinds of resin selected from the resin group; or a copolymer of two or more kinds of resin selected from the resin group.

On the other hand, in a case where the binder includes a UV curable resin, the UV curable resin is not particularly limited, but an acrylic UV curable resin may be preferably used, for example.

The content of the heat ray shielding particles dispersed and included in the heat ray shielding particle dispersion is not particularly limited, but freely selected depending on an intended use or the like. For example, the content of the heat ray shielding particles in the heat ray shielding particle dispersion is preferably greater than or equal to 0.001% by mass and less than or equal to 80.0% by mass, and is more preferably greater than or equal to 0.01% by mass and less than or equal to 70.0% by mass.

This is because in a case where the content of the heat ray shielding particles in the heat ray shielding particle dispersion is less than 0.001% by mass, it is required to thicken a thickness of the dispersion in order to obtain infrared ray shielding effects required for the heat ray shielding particle dispersion, an intended use to be used may be limited, and it may become difficult to be carried.

This is because in a case where the content of the heat ray shielding particles exceeds 80.0% by mass, the intensity is decreased in the heat ray shielding particle dispersion because a proportion of the binder that is a proportion of the thermoplastic resin or the UV curable resin is decreased, for example.

Further, it is preferable that the content of the heat ray shielding particles per unit projected area included in the heat ray shielding particle dispersion is greater than or equal to 0.04 g/m$^2$ and less than or equal to 4.0 g/m$^2$ so that the heat ray shielding particle dispersion obtains infrared ray shielding effects. Note that the "content per unit projected are" means a weight (g) of the heat ray shielding particles contained, in the heat ray shielding particle dispersion according to the embodiment per unit area (m$^2$) that light passes, in the thickness direction.

The heat ray shielding particle dispersion may be formed into a suitable shape depending on an intended use. For example, the heat ray shielding particle dispersion may have a sheet shape, a board shape, or a film shape, and may be applicable to various intended uses.

Here, a method of producing the heat ray shielding particle dispersion according to the embodiment will be described.

For example, the heat ray shielding particle dispersion liquid may be produced by mixing the above described binder with the heat ray shielding particles according to the embodiment, forming into a desired shape, and then, hardening it.

The heat ray shielding particle dispersion may be produced by using the above described heat ray shielding particle dispersion liquid, for example. In this case, a heat ray shielding particle dispersion powder, a plasticizer dispersion liquid, or a masterbatch is produced as described in the following. Next, the produced heat ray shielding particle dispersion powder or the like is used to produce the heat ray shielding particle dispersion. It will be specifically described in the following.

First, a mixing process of mixing the above described heat ray shielding particle dispersion liquid with thermoplastic resin or a plasticizer can be performed. Next, a drying process of removing solvent component(s) derived from the heat ray shielding particle dispersion liquid can be performed. By removing the solvent component, it is possible to obtain a heat ray shielding particle dispersion powder that is a dispersion, in which the heat ray shielding particles are dispersed in a high concentration in the thermoplastic resin and/or in the dispersant derived from heat ray shielding particle dispersion liquid (may be simply referred to as "dispersion powder" hereinafter), or obtain a dispersion liquid, in which the heat ray shielding particles are dispersed in a high concentration in the plasticizer (may be simply referred to as "plasticizer dispersion liquid" hereinafter).

The method of removing the solvent component from the mixture of the heat ray shielding particle dispersion liquid and the thermoplastic resin or the like is not particularly limited. For example, it is preferable to use a method of drying under reduced pressure the mixture of the heat ray shielding particle dispersion liquid and the thermoplastic resin or the like. Specifically, the mixture of the heat ray shielding particle dispersion liquid and the thermoplastic resin or the like is dried under reduced pressure while being stirred to separate the solvent component from the dispersion powder or the plasticizer dispersion liquid. An apparatus used for the drying under reduced pressure is not particularly limited, but a vacuum stirrer type drying machine or any apparatus having the required function may be used. Further, a pressure value at the time of reduction in pressure of the drying process is not particularly limited but may be freely selected.

By using the drying method under reduced pressure at the time of removing the solvent component, efficiency can be enhanced of removing the solvent from the mixture of the heat ray shielding particle dispersion liquid and the thermoplastic resin or the like. Further, in a case where the drying method under reduced pressure is used, because the heat ray shielding particle dispersion powder or the plasticizer dispersion liquid is not exposed to a high temperature for a long time, it is possible to prevent the heat ray shielding particles dispersed in the dispersion powder or in the plasticizer dispersion liquid from aggregating, and the drying method under reduced pressure is preferable. Further, because productivity of the heat ray shielding particle dispersion powder or the plasticizer dispersion liquid is increased, and the evaporated solvent is easily recalled, the drying method under reduced pressure is preferable in terms of environment-friendliness.

In the heat ray shielding particle dispersion powder or the plasticizer dispersion liquid obtained after the above described drying process, the remaining solvent is preferably less than or equal to 5% by mass. In a case where the remaining solvent is less than or equal to 5% by mass, for example, air bubbles are not generated when a heat ray shielding particle dispersion laminated transparent base material, which will be described later below, is produced by using the heat ray shielding particle dispersion powder or the plasticizer dispersion liquid, and optical characteristics and appearance can be kept good.

A masterbatch may be used when the heat ray shielding particle dispersion is produced as described above.

For example, the masterbatch may be produced by dispersing, in resin, the heat ray shielding particle dispersion liquid or the heat ray shielding particle dispersion powder and pelletizing the resin.

As for another method of producing a masterbatch, first, the heat ray shielding particle dispersion liquid or the heat ray shielding particle dispersion powder is homogeneously mixed with a pellet or a powder and granular material of thermoplastic resin. Another additive agent may be mixed as needed. Then, the obtained mixture is mixed, by a vent-type one or two axes extruder, to form a pellet shape by a method of cutting the general strand melt-extruded. Thereby, the masterbatch can be produced. In this case, its shape may be a columnar shape or a square column shape. It is also possible to use a so-called "hot cut method" of directly cutting the melt-extruded material. In this case, it has a substantially sphere shape in general.

According to the above described procedure, the heat ray shielding particle dispersion powder, the plasticizer dispersion liquid, and the masterbatch can be produced.

Then, a heat ray shielding particle dispersion according to the embodiment can be produced by uniformly mixing the heat ray shielding particle dispersion powder, the plasticizer dispersion liquid, or the masterbatch into a binder to form a desired shape. At this time, an inorganic binder or an organic binder such as resin may be used as the binder as described above. It is preferable to use, as the binder, thermoplastic resin or UV curable resin especially. Because the thermoplastic resin and the UV curable resin, which can be used especially preferably, are already described, their descriptions are omitted here.

In a case where a thermoplastic resin is used as the binder, the heat ray shielding particle dispersion powder, the plasticizer dispersion liquid, or the masterbatch can be mixed with the thermoplastic resin, and an additive agent such as a plasticizer may be mixed as needed. Then, the mixed substance is formed, by various forming methods such as an extrusion molding method, an injection molding method, a calender roll method, an extrusion method, a casting method, or an inflation method, into a flat shape or a curved shape to produce the heat ray shielding particle dispersion having the sheet shape, for example.

For example, in a case where the heat ray shielding particle dispersion using the thermoplastic resin as the binder is used as an interlayer arranged between transparent base materials, a plasticizer can be added at the time of producing the heat ray shielding particle dispersion when the thermoplastic resin included in the heat ray shielding particle dispersion has not sufficient flexibility or has not sufficient adhesiveness with the transparent base materials. Specifically, for example, in a case where the thermoplastic resin is polyvinyl acetal resin, it is preferable to further add a plasticizer.

The plasticizer to be added is not particularly limited, but a substance, which can serve as a plasticizer with respect to a used thermoplastic resin, may be used. For example, in a case where polyvinyl acetal resin is used as the thermoplastic resin, it is preferable to use, as the plasticizer, a plasticizer that is a chemical compound of monovalent alcohol with organic acid ester, an ester plasticizer such as a polyalcohol organic acid ester compound, a phosphoric acid plasticizer such as an organophosphorus plasticizer, or the like.

It is preferable that the plasticizer is an ester compound synthesized from polyalcohol and fatty acid because the plasticizer is preferably in liquid at a room temperature.

As described above, the heat ray shielding particle dispersion according to the embodiment may have an optional shape, and may have a sheet shape, a board shape, or a film shape, for example.

The heat ray shielding particle dispersion having the sheet shape, the board shape, or the film shape may be used to produce, for example, a heat ray shielding particle dispersion laminated transparent base material, an infrared ray absorbing transparent base material, or the like that will be described.

(Heat-Ray-Shielding-Particle-Dispersion-Laminated-Transparent-Base-Material and Method of Producing the Material)

Next, a configuration example of a heat ray shielding particle dispersion laminated transparent base material and a method of producing the base material according to the embodiment will be described.

The heat ray shielding particle dispersion laminated transparent base material according to the embodiment may include a plurality of sheets of transparent base materials and the heat ray shielding particle dispersion according to the embodiment. Then, the heat ray shielding particle dispersion laminated transparent base material may have a structure in which the heat ray shielding particle dispersion is arranged between the plurality of transparent base materials.

The heat ray shielding particle dispersion laminated transparent base material according to the embodiment may have a structure in which the heat ray shielding particle dispersion, which is an interlayer, is sandwiched by using the transparent base materials from both sides of the heat ray shielding particle dispersion.

The transparent base material is not particularly limited, but may be freely selected in consideration of the visible light transmittance and the like. For example, it is preferable to use, as the transparent base material, one or more kinds selected from flat glass, a plastic having a plate shape, a plastic having a board shape, a plastic having a film shape, and the like. Note that it is preferable that the transparent base material is transparent with respect to light in a visible range.

In a case where a plastic transparent base material is used, a material of the plastic is not particularly limited, but may be selected depending on an intended use and polycarbonate resin, acrylic resin, polyethylene terephthalate resin, PET resin, polyamide resin, vinyl chloride resin, olefin resin, epoxy resin, polyimide resin, fluororesin, or the like can be used.

Note that two or more sheets of transparent base materials may be used for the heat ray shielding particle dispersion laminated transparent base material according to the embodiment. In a case where two or more sheets of transparent base materials are used, transparent base materials made from the same material may be combined to be used or transparent base materials made from different materials may be combined to be used as the constituting transparent base materials, for example. Further, it is not required for the constituting transparent base materials to have the same thickness, but transparent base materials having different thicknesses may be combined to be used.

The heat ray shielding particle dispersion laminated transparent base material according to the embodiment may use the above described heat ray shielding particle dispersion according to the embodiment as an interlayer. Because the heat ray shielding particle dispersion has been described above, its description is omitted here.

The heat ray shielding particle dispersion, used for the heat ray shielding particle dispersion laminated transparent base material according to the embodiment, is not particularly limited, but a dispersion formed into a sheet shape, a board shape, or a film shape may be preferably used.

The heat ray shielding particle dispersion laminated transparent base material may be produced by bonding and integrating the plurality of sheets of transparent base materials facing with each other with sandwiching the heat ray shielding particle dispersion formed into a sheet shape or the like.

According to the heat ray shielding particle dispersion laminated transparent base material and the above described heat ray shielding particle dispersion of the embodiment, their optical characteristics can have the solar transmittance less than or equal to 35% when the visible light transmittance is 70%, and can have a good heat ray shielding property.

Note that the visible light transmittance can be easily adjusted to be 70% by adjusting the concentration of the heat ray shielding particles, contained in the above described heat ray shielding particle dispersion liquid, the dispersion powder, the plasticizer dispersion liquid, or the masterbatch, the additive amount of the heat ray shielding particles, the dispersion powder, the plasticizer dispersion liquid, or the masterbatch when a resin composition is prepared, and the film thickness of the film or the sheet.

According to the heat ray shielding particle dispersion laminated transparent base material of the embodiment described above, it is possible to realize a high weather resistance. Further, because the tinting strength of the heat ray shielding particle dispersion, included in the heat ray shielding particle dispersion laminated transparent base material of the embodiment, is excellent, it is possible to reduce the content (amount used) of the heat ray shielding particles per unit projected area even when the solar transmittance is less than or equal to 35%.

(Infrared-Ray-Absorbing-Transparent-Base-Material and Method of Producing the Material)

Next, a configuration example of an infrared ray absorbing transparent base material and a method of producing the material according to the embodiment will be described.

The infrared ray absorbing transparent base material according to the embodiment may include a transparent base material and a coating layer, containing heat ray shielding particles according to the embodiment, arranged on at least one surface of the transparent base material. As the transparent base material, a transparent resin base material or a transparent glass base material may be used.

As described above, the infrared ray absorbing transparent base material according to the embodiment may include a coating layer, containing heat ray shielding particles according to the embodiment, arranged on at least one surface of the transparent base material.

A method of forming the above coating layer is not particularly limited. For example, a heat ray shielding particle dispersion liquid according to the embodiment may be used to form, on at least one surface of the transparent base material, the coating layer containing the heat ray shielding particles. Specifically, the coating layer may be formed through the following procedure, for example.

As for a first method, an application liquid is prepared by mixing the heat ray shielding particle dispersion liquid according to the embodiment with plastic, a monomer, or the like. Then, a coating layer can be formed on a transparent base material by using the prepared application liquid.

Specifically, for example, first, medium resin is added to the heat ray shielding particle dispersion liquid of the embodiment to obtain the application liquid. Then, after the surface of the transparent base material is coated with the application liquid, the solvent is evaporated and the medium resin is hardened by a predetermined method to form the coating layer in which the heat ray shielding particles are dispersed in the medium.

The medium resin used at this time is not particularly limited. For example, a UV curable resin, thermosetting resin, electron beam curable resin, resin curable at room temperature, thermoplastic resin, or the like may be selected depending on a purpose. Specifically, for example, as the medium resin, polyethylene resin, polyvinyl chloride resin, polyvinylidene chloride resin, polyvinyl alcohol resin, polystyrene resin, polypropylene resin, an ethylene-vinyl-acetate copolymer, polyester resin, polyethylene terephthalate resin, fluorine resin, polycarbonate resin, acrylic resin, polyvinyl butyral resin or the like may be used. As the medium resin, only one kind of resin may be used, and two or more kinds of resin may be combined to be used.

Among the above described medium resins, it is preferable, in terms of productivity and device cost, to use a UV curable resin as the medium resin. Thus, in this case, the coating layer may further include the UV curable resin.

As for a second method, an application liquid is made by mixing the heat ray shielding particle dispersion liquid according to the embodiment with metal alkoxide. Then, a coating layer can be formed on a transparent base material by applying the application liquid on the surface of the transparent base material and hydrolyzing.

For example, an alkoxide of Si, Ti, Al, Zr, or the like may be used as the metal alkoxide used for the above second method. The coating layer consisting of an oxide film may be formed by causing the binder using such metal alkoxide to be hydrolyzed and polycondensed through heating or the like.

As for a third method, after the heat ray shielding particle dispersion liquid is applied on a predetermined surface of a transparent base material, a coating layer can be formed by further applying a binder that uses metal alkoxide or medium resin. The metal alkoxide or medium resin used at this time is not particularly limited, but materials described in the first method and the second method may be preferably used, for example.

A transparent resin base material or a transparent glass base material may be used as the transparent base material used for the infrared ray absorbing transparent base material according to the embodiment. A thickness, a shape, and the like of the transparent base material are not particularly limited. For example, a transparent base material having a film shape, a board shape, or a sheet shape may be used.

In a case where the transparent resin base material is used as the transparent base material, a material of the transparent resin base material is not particularly limited, but may be selected depending on various purposes, for example. For example, as the material of the transparent resin base material, various kinds of resin such as polyester, acrylic, urethane, polycarbonate, polyethylene, an ethylene-vinyl-acetate copolymer, vinyl chloride, or fluorine resin may be used. Especially, as the material of the transparent resin base material, polyester is preferable and polyethylene terephthalate (PET) is more preferable. A polyester film may be preferably used as the transparent base material because it is especially usable for various intended uses.

It is preferable that a surface treatment is applied to the surface of the transparent base material in order to easily bond the coating layer.

In order to enhance the adhesiveness of the transparent base material and the coating layer, an interlayer may be formed on the surface of the transparent base material, to which the coating layer is to be formed, and the coating layer may be formed on the interlayer.

In a case where the interlayer is formed, a configuration of the interlayer is not particularly limited, but may be freely selected. For example, the interlayer may be constituted with a polymer film, a metal layer, an inorganic layer (an inorganic oxide layer such as silica, titania, zirconia, for example), an organic/inorganic composite layer, or the like.

The method of applying the material of the coating layer when the coating layer is provide on the transparent base material is not particularly limited, but may be any method by which the heat ray shielding particle dispersion liquid can be uniformly applied on the surface of the transparent base material. For example, a bar-coating method, a gravure-coating method, a spray-coating method, a dip-coating method, or the like may be used.

Here, for example, an example, in which a bar-coating method is used to form the coating layer by use of the application liquid obtained by mixing the heat ray shielding particle dispersion liquid of the embodiment and UV curable resin as described in the first method, will be described as an example of a process of forming the coating layer.

In a case where the application liquid, in which the heat ray shielding particle dispersion liquid of the embodiment is mixed with the UV curable resin, is applied by the bar-coating method, it is preferable to prepare the application liquid by appropriately adjusting the liquid concentration, an additive agent, and the like to have an appropriate leveling property. Then, a wire bar having an appropriate bar number, in accordance with a desired thickness of the coating layer and a content of the heat ray shielding particles in the coating layer, may be used to form an application film of the application liquid on the transparent base material. Next, after the solvent included in the application liquid is removed by drying, the coating layer can be formed on the transparent base material by emitting ultraviolet rays and hardening it.

A condition of drying the application film at this time may vary depending on components included in the application liquid, and a proportion of use and a kind of the solvent. For example, the application film may be dried by heating for about 20 seconds to 10 minutes at temperature of 60° C. to 140° C.

The method of emitting ultraviolet rays is not particularly limited, but a UV exposure device such as a super high-pressure mercury lamp may be preferably used, for example.

Additionally, a voluntary process may be performed before and after the process of forming the coating layer to operate the adhesiveness between the coating layer and the transparent base material that is a base material, a drying property of the organic solvent, a smoothing property of the application film at the time of coating, and the like. For example, as the voluntary process to be performed before and after the process of forming the coating layer, a surface treatment process of the transparent base material, a pre-baking process (pre-heating of the transparent base material), a post-baking process (post-heating of the transparent base material), and/or the like may be selected as appropriate. In a case where the pre-baking process and/or the post-baking process is applied, it is preferable that a heating temperature is in a range from 80° C. to 200° C. and a heating time is in a range from 30 seconds to 40 second, in the performed process(es).

The thickness of the coating layer on the transparent base material is not particularly limited, but is preferably shorter than or equal to 10 μm and is more preferably shorter than or equal to 6 μm. This is because when the thickness of the coating layer is shorter than or equal to 10 μm, in addition to having a sufficient pencil hardness and rubfastness, it is possible to reduce an occurrence of process abnormality such as an occurrence of warpage of the base film when the binder is hardened and the solvent is sublimated in the coating layer.

The optical characteristics of the produced infrared ray absorbing transparent base material may be good characteristics of solar transmittance 35% or below when the visible light transmittance is 70%. Note that the visible light transmittance is easily made to be 70% by adjusting the concentration of the heat ray shielding particles in the application liquid and the film thickness of the coating layer.

Further, for example, it is preferable that the content of the heat ray shielding particles per unit projected area of the coating layer is greater than or equal to 0.04 g/m$^2$ and less than or equal to 4.0 g/m$^2$.

According to the infrared ray absorbing transparent base material of the embodiment described above, it is possible to realize a high weather resistance. Further, because the tinting strength of the heat ray shielding particles, included in the infrared ray absorbing transparent base material of the embodiment, is excellent, it is possible to reduce the content (amount used) of the heat ray shielding particles per unit projected area even when the solar transmittance is less than or equal to 35%.

Practical Examples

In the following, the present invention will be described more specifically with reference to practical examples. However, the present invention is not limited to the following practical examples.

First, a method of evaluating samples in the following practical examples and comparative examples will be described here.

(Volume Average of Particle Diameter)

A volume average particle diameter of heat ray shielding particles in a heat ray shielding particle dispersion liquid was measured by a micro track particle size distribution meter (Nikkiso Co., Ltd., Model: UPA-UT).

(Visible Light Transmittance and Solar Transmittance)

A visual light transmittance and a solar transmittance of an infrared ray absorbing transparent base material were calculated, based on JIS R 3106, from the transmittance from 300 nm to 2100 nm measured by using a spectrophotometer (Hitachi, Ltd., Model: U-4100).

(Tinting Strength)

A heat ray shielding particle dispersion liquid, diluted with methyl isobutyl ketone (may be referred to as "MIBK" hereinafter) so that the concentration of heat ray shielding particles was 0.02% by mass, was held by a rectangular transparent quartz vessel, having internal diameters 1 cm in horizontal and vertical and 5 cm in height, to measure a transmittance with respect to light of a wavelength of 1500 nm by using a spectrophotometer (Hitachi, Ltd., Model: U-4100). Note that a length of light path length was 1 cm in this case. Further, measured data obtained by filling the rectangular transparent quartz vessel with an organic solvent used to dilute the heat ray shielding particle dispersion liquid was used for a base line of transmittance measurement.

(Heat and Humidity Resistance Test)

A heat and humidity resistance test of an infrared ray absorbing transparent base material was performed by leaving, for 14 days, the obtained infrared ray absorbing transparent base material in a constant temperature and humidity tank, where the temperature was held at 85° C. and the relative humidity was held at 90%, to evaluate a change of the visible light transmittance before and after leaving the obtained infrared ray absorbing transparent base material in the constant temperature and humidity tank. The visible light transmittance was measured by the above described method.

In the following, evaluation results and preparing conditions of samples of the respective practical examples and comparative examples will be described.

Practical Example 1

Respective powders of tungstic acid ($H_2WO_4$), cesium carbonate ($Cs_2CO_3$), and lithium carbonate ($Li_2CO_3$) were weighted and mixed so that a proportion of Li, Cs, and W included in the mixed powder became Li/Cs/W (mole ratio)=0.67/0.33/1, and the respective powders were sufficiently mixed by an agate mortar to obtain the mixed powder.

Next, a heat treatment was applied to the obtained mixed powder under a mixed atmosphere of inert gas and reducing gas. Specifically, the mixed powder was heated under supplying 5% by volume of $H_2$ gas using $N_2$ gas as a carrier to perform the heat treatment (reduction treatment) for one hour at a temperature of 600° C.

After the above heat treatment was finished, the mixed powder was further burned at 800° C. under a $N_2$ gas atmosphere for 30 minutes to obtain a powder of heat ray shielding particles represented by $Li_{0.67}Cs_{0.33}WO_3$ (referred to as the "powder A" hereinafter).

As a result of measuring the powder A by X-ray diffractometry, it was a pure hexagonal crystal, and a diffraction line of a by-product such as lithium carbonate or lithium hydroxide was not observed. Further, as a result of observing the powder A by a transmission-type electron microscope, segregation such as a lithium compound was not observed in a grain boundary of the powder A. Accordingly, it was determined that the added lithium component was completely solid-solved in a crystal of hexagonal cesium tungsten bronze.

Next, the obtained powder A was used to prepare heat ray shielding particle dispersion liquid.

First, 20% by mass of the powder A, 10% by mass of an acrylic polymer dispersant (which is an acrylic dispersant whose amine value is 48 mgKOH/g and decomposition temperature is 250° C.) that includes amine as a functional group, and 70% by mass of methyl isobutyl ketone as a solvent were weighted. Then, these materials were loaded in a paint shaker, in which $ZrO_2$ beads of 0.3=9 were put, and a milling/dispersion treatment was conducted for 10 hours to obtain a heat ray shielding particle dispersion liquid (hereinafter, referred to as the "dispersion liquid A"). The volume average particle diameter of the heat ray shielding particles in the dispersion liquid A was measured, and it was 23 nm.

Next, a tinting strength of the obtained dispersion liquid A was evaluated.

The tinting strength was evaluated through the above described procedure. The transmittance of the diluted solution, diluted with MIBK so that the concentration of the heat ray shielding particles in the dispersion liquid A was 0.02% by mass, with respect to light having a wavelength of 1500 nm was measured, and it was confirmed that the transmittance was 9.4%.

Note that, in case of cesium tungsten bronze without lithium that will be described later below in comparative example 1, the transmittance, which was similarly measured, was 15.1%, and it was confirmed that, in the dispersion liquid having the same concentration, the transmittance of infrared light was more decreased in practical example 1. That is, it was confirmed that the tinting strength of the dispersion liquid A of practical example 1 was higher than that of the dispersion liquid of comparative example 1.

Next, the dispersion liquid A was used to produce an infrared ray absorbing transparent base material.

50 parts by mass of ARONIX UV-3701 (Toagosei Company, Limited) that is an acrylic UV curable resin was mixed with 100 parts by mass of the dispersion liquid A to prepare an application liquid.

Next, the prepared application liquid was applied onto a transparent resin film by a bar coater to form an application film. Then, after drying the application film at 80° C. for 60 seconds to evaporate the solvent, it was hardened by a high-pressure mercury lamp to form a coating layer containing the heat ray shielding particles and to produce the infrared ray absorbing transparent base material.

Note that when the above described infrared ray absorbing transparent base material was produced, a concentration of the heat ray shielding particles of the application liquid and a film thickness of the coating layer were adjusted so that the visible light transmittance of the infrared ray absorbing transparent base material was 70%. Then, optical characteristics of the obtained infrared ray absorbing transparent base material (hereinafter, referred to as the "infrared ray absorbing transparent base material A") were measured. As a result, the solar transmittance was 32.6%.

Next, a heat and humidity resistance test was conducted on the infrared ray absorbing transparent base material A under the above described conditions to measure the visible light transmittance after the heat and humidity resistance test, and it was confirmed that the visible light transmittance was 70.9%.

That is, it was confirmed that the change of the visible light transmittance of the infrared ray absorbing transparent base material before and after the heat and humidity resistance test was 0.9%.

On the other hand, in a case of an infrared ray absorbing transparent base material including, as heat ray shielding particles, cesium tungsten bronze without lithium that will be described later below in comparative example 1, it was confirmed that the change of the visible light transmittance before and after the heat and humidity resistance test was 2.4%. Accordingly, it was confirmed that, in the infrared ray absorbing transparent base material of practical example 1, the amount of change of the visible light transmittance before and after the heat and humidity resistance test was small, and a resistance to heat and humidity that is a weather resistance was improved.

The above described evaluation results are described in table 1.

Comparative Example 1

Respective powders of tungstic acid ($H_2WO_4$) and cesium carbonate ($Cs_2CO_3$) were weighted and mixed so that a proportion of Cs and W included in the mixed powder became Cs/W (mole ratio)=0.33/1. Then, other than not adding a lithium compound, in a way similar to that of practical example 1, a powder of heat ray shielding particles having a hexagonal crystal structure and a composition represented by $Cs_{0.33}WO_3$.

Under conditions similar to those of practical example 1, the obtained powder of the heat ray shielding particles was milled and dispersed by using a paint shaker together with a dispersant and a solvent to prepare a heat ray shielding particle dispersion liquid. A volume average particle diameter of the heat ray shielding particles included in the obtained heat ray shielding particle dispersion liquid was measured, and it was 25 nm.

By using the obtained heat ray shielding particle dispersion liquid, the tinting strength was evaluated under conditions similar to those of practical example 1. Then, it was confirmed that the transmittance of the diluted solution, of which the concentration of the heat ray shielding particles in the liquid was 0.02% by mass, with respect to light having a wavelength of 1500 nm was 15.1%.

Further, an infrared ray absorbing transparent base material, of which the visible light transmittance is 70%, was prepared in a way similar to that of practical example 1. Then, optical characteristics of the infrared ray absorbing transparent base material were measured. As a result, the solar transmittance was 33.3%.

Further, a heat and humidity resistance test was conducted on the prepared infrared ray absorbing transparent base material, under conditions similar to those of practical example 1, to measure the visible light transmittance after the conducted test, and it was confirmed that the visible light transmittance was 70.9%. That is, it was confirmed that the change of the visible light transmittance before and after the heat and humidity resistance test was 2.4%.

The evaluation results are described in table 1.

Practical Examples 2 to 12

Substances described in table 1 were selected as the element M and the substance containing the element M. Then, respective powders of tungstic acid ($H_2WO_4$), the substance containing the element M, and lithium carbonate ($Li_2CO_3$) were weighted and mixed so that x and y, which are mole ratios of Li and the element M with respect to W included in the mixed powder, become numerical values illustrated in table 1, and the respective powders were sufficiently mixed by an agate mortar to obtain the mixed powder.

As for the prepared mixed powder, powders of heat ray shielding particles of practical examples 2 to 12 were prepared in conditions similar to those of practical example 1 other than adjusting burning time so that mole ratios z of elemental oxygen with respect to elemental tungsten in composite tungsten oxides became values illustrated in table 1. Note that in practical examples 2 to 12, powders of heat ray shielding particles having a hexagonal crystal structure represented by the general formula $Li_xM_yWO_z$ were prepared. In the above general formula, x, y, z, and the element M were values and the element illustrated in table 1 for each practical example.

X-ray diffraction measurement and transmission electron microscope observation were conducted on the powders of the heat ray shielding particles obtained in respective practical examples, and it was confirmed that Li was solid-dissolved in a hexagonal cesium tungsten bronze particle crystal.

In a method similar to that of practical example 1, the prepared powders of the heat ray shielding particles were used to prepare and evaluate heat ray shielding particle dispersion liquids and infrared ray absorbing transparent base materials according to respective practical examples 1 to 12.

The evaluation results are described in table 1.

Practical Example 13

Respective powders of lithium carbonate ($Li_2CO_3$) and cesium tungsten oxide ($Cs_{0.33}WO_3$) were weighted and mixed so that a proportion of Li, Cs, and W included in the mixed powder became Li/Cs/W (mole ratio)=0.67/0.33/1 to obtain the mixed powder. Other than using the above mixed powder, in a way similar to that of practical example 1, a powder of heat ray shielding particles having a composition represented by $Li_{0.67}Cs_{0.33}WO_3$ was prepared.

As a result of measuring the obtained powder of the heat ray shielding particles by X-ray diffractometry, it was a pure hexagonal crystal, and a diffraction line of a by-product was not observed. Further, as a result of observing the powder by a transmission-type electron microscope, segregation such as a lithium compound was not observed in a grain boundary of the obtained powder of the heat ray shielding particles. Accordingly, it was determined that the added lithium component was completely solid-solved in a crystal of hexagonal cesium tungsten bronze.

Under conditions similar to those of practical example 1, the obtained powder of the heat ray shielding particles was milled and dispersed by using a paint shaker together with a dispersant and a solvent to prepare a heat ray shielding particle dispersion liquid. A volume average particle diameter of the heat ray shielding particles included in the obtained heat ray shielding particle dispersion liquid was measured, and it was 25 nm.

By using the obtained heat ray shielding particle dispersion liquid, the tinting strength was evaluated under conditions similar to those of practical example 1. Then, it was confirmed that the transmittance of the diluted solution, of which the concentration of the heat ray shielding particles in the liquid was 0.02% by mass, with respect to light having a wavelength of 1500 nm was 9.5%.

Further, an infrared ray absorbing transparent base material, of which the visible light transmittance is 70%, was prepared in a way similar to that of practical example 1. Then, optical characteristics of the infrared ray absorbing transparent base material were measured. As a result, the solar transmittance was 32.7%.

Further, a heat and humidity resistance test was conducted on the prepared infrared ray absorbing transparent base material, under conditions similar to those of practical example 1, to measure the visible light transmittance after the conducted test, and it was confirmed that the visible light transmittance was 71.0%. That is, it was confirmed that the change of the visible light transmittance before and after the heat and humidity resistance test was 1.0%.

The evaluation results are described in table 1.

Practical Example 14

Respective powders of lithium carbonate ($Li_2CO_3$), tungstic acid ($H_2WO_4$), and cesium carbonate ($Cs_2CO_3$) were weighted and mixed so that a proportion of Li, Cs, and W included in the mixed first raw material mixture became Li/Cs/W (mole ratio)=0.67/0.33/1, and the respective powders were sufficiently mixed by an agate mortar to obtain the first raw material mixture (powder).

Next, a heat treatment was applied to the obtained first raw material mixture under a mixed atmosphere of inert gas and reducing gas (first heat treatment process). Specifically, the first raw material mixture was heated under supplying 5% by volume of $H_2$ gas using $N_2$ gas as a carrier to perform the heat treatment (reduction treatment) for one hour at a temperature of 600° C.

After the above heat treatment was finished, the first raw material mixture was further burned at 800° C. under a $N_2$ gas atmosphere for 30 minutes. It was confirmed, by conducting X-ray diffraction measurement on the obtained minute powder, that the obtained fine powder has a hexagonal crystal structure.

The product obtained after the heat treatment under the above $N_2$ gas atmosphere and a powder of cesium carbonate were weighted and mixed to obtain a second raw material mixture (powder) so that a proportion of Li, Cs, and W included in the second raw material mixture became Li/Cs/W (mole ratio)=0.67/0.33/1.

Then, a heat treatment was applied to the obtained second raw material mixture under a mixed atmosphere of inert gas and reducing gas (second heat treatment process). Specifically, the second raw material mixture was heated under supplying 5% by volume of $H_2$ gas using $N_2$ gas as a carrier to perform the heat treatment (reduction treatment) for thirty minutes at a temperature of 600° C.

After the above heat treatment was finished, the second raw material mixture was further burned at 800° C. under a $N_2$ gas atmosphere for 30 minutes to prepare a powder of the heat ray shielding particles represented by $Li_{0.67}Cs_{0.33}WO_3$.

As a result of measuring the obtained powder of the heat ray shielding particles by X-ray diffractometry, it was a pure hexagonal crystal, and a diffraction line of a by-product such as lithium carbonate or lithium hydroxide was not observed. Further, as a result of observing the obtained powder of the heat ray shielding particles by a transmission-type electron microscope, segregation such as a lithium compound was not observed in a grain boundary of the obtained powder of the heat ray shielding particles. Accordingly, it was determined that the added lithium component was completely solid-solved in a crystal of hexagonal cesium tungsten bronze.

Under conditions similar to those of practical example 1, the obtained powder of the heat ray shielding particles was milled and dispersed by using a paint shaker together with a dispersant and a solvent to prepare a heat ray shielding particle dispersion liquid. A volume average particle diameter of the heat ray shielding particles included in the obtained heat ray shielding particle dispersion liquid was measured, and it was 25 nm.

By using the obtained heat ray shielding particle dispersion liquid, the tinting strength was evaluated under conditions similar to those of practical example 1. Then, it was confirmed that the transmittance of the diluted solution, of which the concentration of the heat ray shielding particles in the liquid was 0.02% by mass, with respect to light having a wavelength of 1500 nm was 9.4%.

Further, an infrared ray absorbing transparent base material, of which the visible light transmittance is 70%, was prepared in a way similar to that of practical example 1. Then, optical characteristics of the infrared ray absorbing transparent base material were measured. As a result, the solar transmittance was 32.7%.

Further, a heat and humidity resistance test was conducted on the prepared infrared ray absorbing transparent base material, under conditions similar to those of practical example 1, to measure the visible light transmittance after the conducted test, and it was confirmed that the visible light transmittance was 70.9%. That is, it was confirmed that the change of the visible light transmittance before and after the heat and humidity resistance test was 0.9%.

The evaluation results are described in table 1.

Comparative Example 2

Respective powders of tungstic acid ($H_2WO_4$) and lithium carbonate ($Li_2CO_3$) were weighted and mixed so that a proportion of Li and W included in the mixed powder became Li/W (mole ratio)=0.33/1. Other than not adding a substance containing the element M, in a way similar to that of practical example 1, the mixed powder was prepared. Then, other than using the prepared mixed powder, in a way similar to that of practical example 1, a powder of heat ray shielding particles having a composition represented by $Li_{0.33}WO_3$ was prepared.

As a result of measuring the obtained powder of the heat ray shielding particles by X-ray diffractometry, it was confirmed that a diffraction line of a by-product such as lithium carbonate or lithium hydroxide was not observed, but the crystal structure was not a hexagonal crystal but a pure cubical crystal.

Under conditions similar to those of practical example 1, the obtained powder of the heat ray shielding particles was milled and dispersed by using a paint shaker together with a dispersant and a solvent to prepare a heat ray shielding particle dispersion liquid. A volume average particle diameter of the heat ray shielding particles included in the obtained heat ray shielding particle dispersion liquid was measured, and it was 30 nm.

By using the obtained heat ray shielding particle dispersion liquid, the tinting strength was evaluated under conditions similar to those of practical example 1. Then, it was confirmed that the transmittance of the diluted solution, of which the concentration of the heat ray shielding particles in the liquid was 0.02% by mass, with respect to light having a wavelength of 1500 nm was 25.6%.

Further, an infrared ray absorbing transparent base material, of which the visible light transmittance is 70%, was prepared in a way similar to that of practical example 1. Then, optical characteristics of the infrared ray absorbing transparent base material were measured. As a result, the solar transmittance was 42.8%.

Further, a heat and humidity resistance test was conducted on the prepared infrared ray absorbing transparent base material, under conditions similar to those of practical example 1, to measure the visible light transmittance after the conducted test, and it was confirmed that the visible light transmittance was 78.5%. That is, it was confirmed that the change of the visible light transmittance before and after the heat and humidity resistance test was 8.5%.

The evaluation results are described in table 1.

Comparative Example 3

Respective powders of tungstic acid ($H_2WO_4$), cesium carbonate ($Cs_2CO_3$), and lithium carbonate ($Li_2CO_3$) were weighted and mixed so that a proportion of Li, Cs, and W included in the mixed powder became Li/Cs/W (mole ratio)=0.10/0.33/1. Other than this, in a way similar to that of practical example 1, the mixed powder was prepared. Then, other than using the prepared mixed powder, in a way similar to that of practical example 1, a powder of heat ray shielding particles having a composition represented by $Li_{0.10}Cs_{0.33}WO_3$ was prepared.

Under conditions similar to those of practical example 1, the obtained powder of the heat ray shielding particles was milled and dispersed by using a paint shaker together with a dispersant and a solvent to prepare a heat ray shielding particle dispersion liquid. A volume average particle diameter of the heat ray shielding particles included in the obtained heat ray shielding particle dispersion liquid was measured, and it was 29 nm.

By using the obtained heat ray shielding particle dispersion liquid, the tinting strength was evaluated under conditions similar to those of practical example 1. Then, it was confirmed that the transmittance of the diluted solution, of which the concentration of the heat ray shielding particles in the liquid was 0.02% by mass, with respect to light having a wavelength of 1500 nm was 15.1%.

Further, an infrared ray absorbing transparent base material, of which the visible light transmittance is 70%, was prepared in a way similar to that of practical example 1. Then, optical characteristics of the infrared ray absorbing transparent base material were measured. As a result, the solar transmittance was 36.3%.

Further, a heat and humidity resistance test was conducted on the prepared infrared ray absorbing transparent base material, under conditions similar to those of practical example 1, to measure the visible light transmittance after the conducted test, and it was confirmed that the visible light transmittance was 74.4%. That is, it was confirmed that the change of the visible light transmittance before and after the heat and humidity resistance test was 4.4%.

The evaluation results are described in table 1.

TABLE 1

| | Li ADDITION | ELEMENT M | SUBSTANCE CONTAINING ELEMENT M | x | y | z | PARTICLE DIAMETER OF VOLUME AVERAGE (nm) |
|---|---|---|---|---|---|---|---|
| PRACTICAL EXAMPLE 1 | ADDED | Cs | $Cs_2CO_3$ | 0.67 | 0.33 | 3 | 23 |
| PRACTICAL EXAMPLE 2 | ADDED | Cs | $Cs_2CO_3$ | 0.33 | 0.33 | 3 | 20 |
| PRACTICAL EXAMPLE 3 | ADDED | Rb | $Rb_2CO_3$ | 0.67 | 0.33 | 3 | 29 |
| PRACTICAL EXAMPLE 4 | ADDED | Rb | $Rb_2CO_3$ | 0.33 | 0.33 | 3 | 31 |
| PRACTICAL EXAMPLE 5 | ADDED | K | KOH | 0.67 | 0.33 | 3 | 22 |
| PRACTICAL EXAMPLE 6 | ADDED | K | KOH | 0.33 | 0.33 | 3 | 22 |
| PRACTICAL EXAMPLE 7 | ADDED | Na | $Na_2CO_3$ | 0.67 | 0.33 | 3 | 24 |
| PRACTICAL EXAMPLE 8 | ADDED | Na | $Na_2CO_3$ | 0.33 | 0.33 | 3 | 30 |
| PRACTICAL EXAMPLE 9 | ADDED | Cs | $Cs_2CO_3$ | 0.67 | 0.30 | 3 | 21 |
| PRACTICAL EXAMPLE 10 | ADDED | Cs | $Cs_2CO_3$ | 0.67 | 0.40 | 3 | 25 |

TABLE 1-continued

| | | | | | | | |
|---|---|---|---|---|---|---|---|
| PRACTICAL EXAMPLE 11 | ADDED | Cs | $Cs_2CO_3$ | 0.67 | 0.33 | 2.8 | 25 |
| PRACTICAL EXAMPLE 12 | ADDED | Ba | $BaCO_3$ | 0.67 | 0.33 | 3 | 22 |
| PRACTICAL EXAMPLE 13 | ADDED | Cs | $(Cs_{0.33}WO_3)$ | 0.67 | 0.33 | 3 | 25 |
| PRACTICAL EXAMPLE 14 | ADDED | Cs | $Cs_2CO_3$ | 0.67 | 0.33 | 3 | 25 |
| COMPARATIVE EXAMPLE 1 | NOT ADDED | Cs | $Cs_2CO_3$ | — | 0.33 | 3 | 25 |
| COMPARATIVE EXAMPLE 2 | ADDED | — | — | 0.33 | — | 3 | 30 |
| COMPARATIVE EXAMPLE 3 | ADDED | Cs | $Cs_2CO_3$ | 0.1 | 0.33 | 3 | 29 |

| | SOLAR TRANSMITTANCE WHEN VISIBLE LIGHT TRANSMITTANCE IS 70% (%) | TRANSMITTANCE OF DISPERSION LIQUID OF 0.02% BY MASS WITH RESPECT TO LIGHT HAVING WAVELENGTH OF 1500 nm (OPTICAL LENGTH 1 cm) (%) | CHANGE OF VISIBLE LIGHT TRANSMITTANCE OF INFRARED RAY ABSORBING TRANSPARENT BASE MATERIAL BEFORE AND AFTER HEAT AND HUMIDITY RESISTANCE TEST (%) |
|---|---|---|---|
| PRACTICAL EXAMPLE 1 | 32.6 | 9.4 | 0.9 |
| PRACTICAL EXAMPLE 2 | 32.9 | 11.5 | 1.8 |
| PRACTICAL EXAMPLE 3 | 32.8 | 9.9 | 1.9 |
| PRACTICAL EXAMPLE 4 | 33.3 | 12.5 | 2.2 |
| PRACTICAL EXAMPLE 5 | 33.0 | 10.0 | 1.4 |
| PRACTICAL EXAMPLE 6 | 33.3 | 12.5 | 1.9 |
| PRACTICAL EXAMPLE 7 | 32.9 | 9.6 | 1.8 |
| PRACTICAL EXAMPLE 8 | 33.6 | 11.6 | 2.2 |
| PRACTICAL EXAMPLE 9 | 32.7 | 9.5 | 1.2 |
| PRACTICAL EXAMPLE 10 | 33.0 | 9.6 | 1.5 |
| PRACTICAL EXAMPLE 11 | 32.9 | 9.4 | 1.0 |
| PRACTICAL EXAMPLE 12 | 34.2 | 13.7 | 1.9 |
| PRACTICAL EXAMPLE 13 | 32.7 | 9.5 | 1.0 |
| PRACTICAL EXAMPLE 14 | 32.7 | 9.4 | 0.9 |
| COMPARATIVE EXAMPLE 1 | 33.3 | 15.1 | 2.4 |
| COMPARATIVE EXAMPLE 2 | 42.8 | 25.6 | 8.5 |
| COMPARATIVE EXAMPLE 3 | 36.3 | 13.7 | 4.4 |

The results of evaluating above described practical examples 1 to 14 and comparative examples 1 to 3 will be described.

It was confirmed that, in the heat ray shielding particle dispersion liquid using the heat ray shielding particles according to each of practical examples 1 to 14, the transmittance with respect to 1500 nm of the dispersion liquid, whose concentration of the heat ray shielding particles was 0.02% by mass, was decreased in comparison with the heat ray shielding particle dispersion liquid using the heat ray shielding particles of comparative example 1. Hence, it was confirmed that the heat ray shielding particles of practical examples 1 to 14 have high tinting strength in comparison with that of comparative example 1.

Further, it was confirmed that the change of the visible light transmittance before and after performing the heat and humidity resistance test on the infrared ray absorbing transparent base material was smaller in practical examples 1 to 14 than that of comparative example 1. It was confirmed from the results that the infrared ray absorbing transparent base material using the heat ray shielding particles of practical examples 1 to 14 has high weather resistance in comparison with the infrared ray absorbing transparent base material using the heat ray shielding particles of comparative example 1.

Note that the heat shielding property of the infrared ray absorbing transparent base material can be evaluated from the value of the solar transmittance of when the visible light transmittance is 70%. It was confirmed that the solar transmittance of each of practical examples 1 to 14 is substantially equal to that of comparative example 1, and the weather resistance is improved in comparison with that of comparative example 1 without decreasing the heat shielding property.

In comparative example 2, the element M was not included and only lithium was added. Therefore, a crystal structure of the tungsten oxide was not a hexagonal crystal but was a cubical, and the heat shielding property of the heat ray shielding film was inferior.

In comparative example 3, because an additive amount (mole ratio) x of lithium was 0.1 and was small, it is considered that the crystal structure of the hexagonal crystal and stability of lithium and cesium in the crystal structure are insufficient. Thus, it is considered that the heat and humidity resistance of the infrared ray absorbing transparent base material and the heat ray shielding particles resulted in inferior in comparison with practical examples 1 to 14.

In the above, the heat ray shielding particles, the heat ray shielding particle dispersion liquid, the heat ray shielding particle dispersion, the heat ray shielding particle dispersion laminated transparent base material, the infrared ray absorbing transparent base material, and the method of producing the heat ray shielding particles are described with reference to the embodiment, and practical examples, and the like. However, the present invention is not limited to the above described embodiment and practical examples, and the like. Various variations and modifications may be made without departing from the scope of the invention as set forth in the accompanying claims.

The present application is based on and claims the benefit of priority of Japanese Priority Application No. 2014-221391 filed on Oct. 30, 2014, the entire contents of Japanese Priority Application No. 2014-221391 are hereby incorporated by reference.

The invention claimed is:

1. Heat ray shielding particles that are composite tungsten oxide particles having a hexagonal crystal structure represented by a general formula $Li_xM_yWO_z$
wherein the element M in the general formula is one or more kinds of elements selected from Cs, Rb, K, Na, and Ba, $0.33 \leq x \leq 0.67$, $0.33 \leq y \leq 0.40$, and $2.8 \leq z \leq 3.0$, and
wherein a volume average particle diameter of the heat ray shielding particles is greater than or equal to 1 nm and less than or equal to 500 nm.

2. The heat ray shielding particles according to claim 1, wherein the element M is one or more kinds of elements selected from cesium, rubidium, potassium, and sodium.

3. A heat ray shielding particle dispersion liquid comprising:
the heat ray shielding particles according to claim 1; and
a liquid medium containing one or more kinds selected from water, an organic solvent, liquid resin, and a liquid plasticizer for plastic.

4. The heat ray shielding particle dispersion liquid according to claim 3, wherein a content of the heat ray shielding, particles is greater than or equal to 0.01% by mass and less than or equal to 50% by mass.

5. A heat ray shielding particle dispersion comprising:
the heat ray shielding particles according to claim 1; and
a solid-state binder.

6. The heat ray shielding particle dispersion according to claim 5, wherein the binder includes at least one of a thermoplastic resin and a UV curable resin.

7. The heat ray shielding particle dispersion according to claim 6, wherein the thermoplastic resin is
one kind of resin selected from a resin group of polyethylene terephthalate resin, polycarbonate resin, acrylic resin, styrene resin, polyamide resin, polyethylene resin, vinyl chloride resin, olefin resin, epoxy resin, polyimide resin, fluororesin, an ethylene-vinyl-acetate copolymer, and polyvinyl acetal resin;
a mixture of two or more kinds of resin selected from the resin group; or
a copolymer of two or more kinds of resin selected from the resin group.

8. The heat ray shielding particle dispersion according to claim 5, wherein a content of the heat ray shielding particles is greater than or equal to 0.001% by mass and less than or equal to 80.0% by mass.

9. The heat ray shielding particle dispersion according to claim 5, wherein the heat ray shielding particle dispersion has a sheet shape, a hoard shape, or a film shape.

10. The heat ray shielding particle dispersion according to claim 5, wherein a content of the heat ray shielding particles per unit projected area is greater than or equal to 0.04 g/m$^2$ and less than or equal to 4.0 g/m$^2$.

11. A heat ray shielding particle dispersion laminated transparent base material comprising:
a plurality of sheets of transparent base materials; and
the heat ray shielding particle dispersion according to claim 5,
wherein the heat ray shielding particle dispersion is arranged between the plurality of sheets of transparent base materials.

12. An infrared ray absorbing transparent base material comprising:
a transparent base material; and
a coating layer, containing the heat ray shielding particles according to claim 1, arranged on at least one surface of the transparent base material,
wherein the transparent base material is a transparent resin base material, or a transparent glass base material.

13. The infrared ray absorbing, transparent base material according to claim 12, wherein the coating layer further includes a UV curable resin.

14. The infrared ray absorbing transparent base material according to claim 12, wherein a thickness of the coating layer is shorter than or equal to 10 μm.

15. The infrared ray absorbing transparent base material according to claim 12, wherein the transparent base material is a polyester film.

16. The infrared ray absorbing transparent base material according to claim 12, wherein a content of the heat ray shielding particles per unit projected area of the coating layer is greater than or equal to 0.04 g/m$^2$ and less than or equal to 4.0 g/m$^2$.

17. A method of producing the heat ray shielding particles according to claim 1, the method comprising:
applying a heat treatment, in a mixed atmosphere of inert gas and reducing gas, to a mixture, which includes a substance containing lithium, a substance containing the element M, and a substance containing tungsten.

18. The method of producing the heat ray shielding particles according to claim 17,
wherein the substance containing lithium is one or more kinds selected from lithium carbonate and lithium hydroxide, wherein the substance containing the element M is one or more kinds selected from carbonate of the element NI, hydroxide of the element M, and oxide of the element M and, wherein the substance containing tungsten is one or more kinds selected from metal tungsten, tungsten oxide, tungstic acid, and ammonium tungstate, wherein the reducing gas is hydrogen, and wherein a proportion of the reducing gas with respect to the mixed atmosphere of the reducing gas and the inert gas is greater than or equal to 0.1% by volume and less than or equal to 20% by volume.

19. A method of producing the heat ray shielding particles according to claim 1, the method comprising:

applying a heat treatment, in a mixed atmosphere of inert gas and reducing gas, to a mixture, which contains a substance containing lithium and a composite tungsten oxide containing the element M.

20. A method of producing the heat ray shielding particles according to claim 1, the method comprising:

a first heat treatment process of applying a heat treatment, in a mixed atmosphere of inert gas and reducing gas, to a first raw material mixture, which includes a substance containing lithium, a substance containing the element M, and a substance containing tungsten, a mole ratio $y1$ of the element M with respect to elemental tungsten being $0.01 \leq y1 < 0.25$;

a second raw material mixture preparation process of preparing a second raw material mixture by adding and mixing a substance containing the element M into a processed mixture obtained through the first heat treatment process; and a second heat treatment process of applying a heat treatment, in a mixed atmosphere of inert gas and reducing gas, to the second raw material mixture, wherein a mole ratio $y2$ of a total of the element M, which is included the first raw material mixture, and the element M, which is included in the substance containing the element M added in the second raw material mixture preparation process, with respect to elemental tungsten included in the first raw material mixture is $0.10 \leq y2 \leq 0.50$.

* * * * *